(12) United States Patent
Saito et al.

(10) Patent No.: US 11,942,081 B2
(45) Date of Patent: Mar. 26, 2024

(54) INFORMATION PROCESSING DEVICE AND INFORMATION PROCESSING METHOD FOR RESPONSE PRESENTATION

(71) Applicant: SONY GROUP CORPORATION, Tokyo (JP)

(72) Inventors: Mari Saito, Tokyo (JP); Hiro Iwase, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 362 days.

(21) Appl. No.: 17/297,192

(22) PCT Filed: Nov. 22, 2019

(86) PCT No.: PCT/JP2019/045741
§ 371 (c)(1),
(2) Date: May 26, 2021

(87) PCT Pub. No.: WO2020/116193
PCT Pub. Date: Jun. 11, 2020

(65) Prior Publication Data
US 2022/0036887 A1 Feb. 3, 2022

(30) Foreign Application Priority Data
Dec. 7, 2018 (JP) .................. 2018-229666

(51) Int. Cl.
*G10L 15/18* (2013.01)
*G10L 15/10* (2006.01)
*G10L 15/22* (2006.01)

(52) U.S. Cl.
CPC .......... *G10L 15/1815* (2013.01); *G10L 15/10* (2013.01); *G10L 15/22* (2013.01); *G10L 2015/223* (2013.01)

(58) Field of Classification Search
CPC ..... G10L 15/10; G10L 15/1815; G10L 15/22; G10L 2015/223
See application file for complete search history.

(56) References Cited

U.S. PATENT DOCUMENTS 9,916,366 B1 * 3/2018 Shukla ............... G06F 16/248
10,127,825 B1 * 11/2018 Nguyen .............. G09B 5/065
(Continued)

FOREIGN PATENT DOCUMENTS

JP 2011-054088 A 3/2011
JP 2011-215900 A 10/2011
(Continued)

OTHER PUBLICATIONS

International Search Report and Written Opinion of PCT Application No. PCT/JP2019/045741, dated Jan. 7, 2020, 08 pages of ISRWO.
(Continued)

*Primary Examiner* — Eric Yen
(74) *Attorney, Agent, or Firm* — CHIP LAW GROUP

(57) ABSTRACT

Provided is an information processing device comprising an estimation unit that estimates a phase regarding the user's decision making, and a response generation unit that generates a response to the user's utterance according to the estimated phase. The present technology can be applied to, for example, smart speakers and smart displays.

20 Claims, 16 Drawing Sheets

(56) References Cited

U.S. PATENT DOCUMENTS

| | | | | |
|---|---|---|---|---|
| 2014/0380179 | A1* | 12/2014 | Bose | G06Q 10/10 |
| | | | | 715/738 |
| 2016/0379120 | A1* | 12/2016 | Merdivan | G06F 16/3344 |
| | | | | 706/46 |
| 2017/0221336 | A1* | 8/2017 | Ogaz | G10L 17/00 |
| 2018/0061400 | A1* | 3/2018 | Carbune | G06F 16/3331 |
| 2019/0348043 | A1* | 11/2019 | Saito | G10L 25/63 |
| 2020/0052896 | A1* | 2/2020 | Acharya | H04L 9/3297 |
| 2020/0211553 | A1* | 7/2020 | Bohl | G06F 3/167 |

FOREIGN PATENT DOCUMENTS

| | | | |
|---|---|---|---|
| JP | 2016-206469 A | | 12/2016 |
| JP | 2021114004 A | * | 8/2021 |

OTHER PUBLICATIONS

Takano, et al., "A Framework of Man-Machine Dialogue Based on the Knowledge Base" IPSJ Sig Notes, vol. 98, No. 63, Jul. 24, 1998, pp. 137-142.

Takano, et al., "A Framework of the Knowledge Base Management for Man-Machine Dialogue", IEICE Technical Report, vol. 99, No. 387, Oct. 25, 1999, pp. 21-28.

* cited by examiner

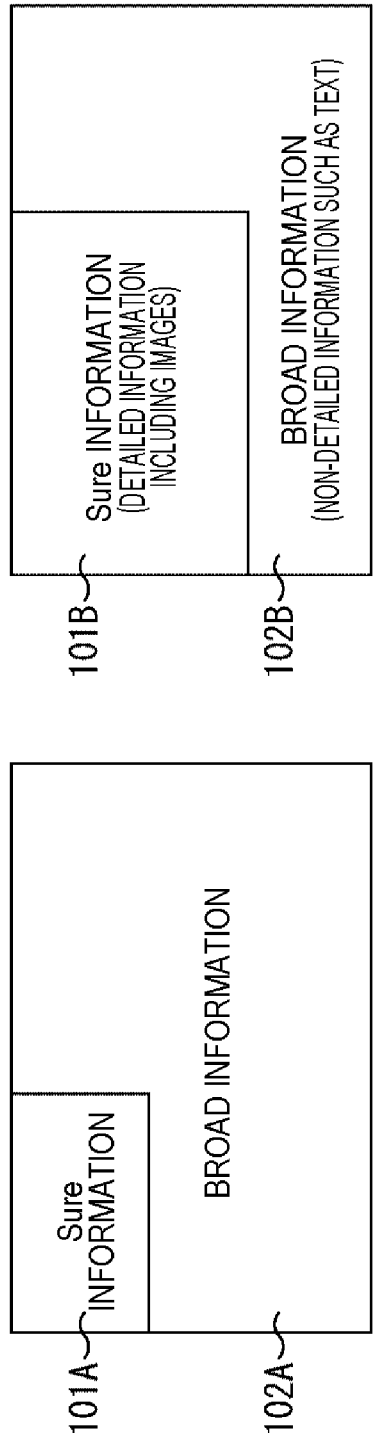
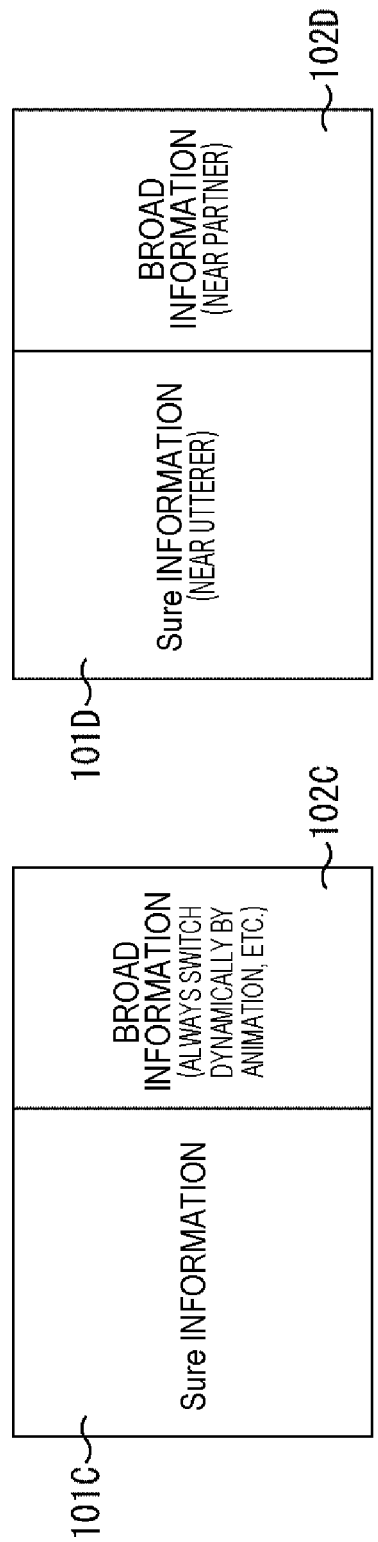
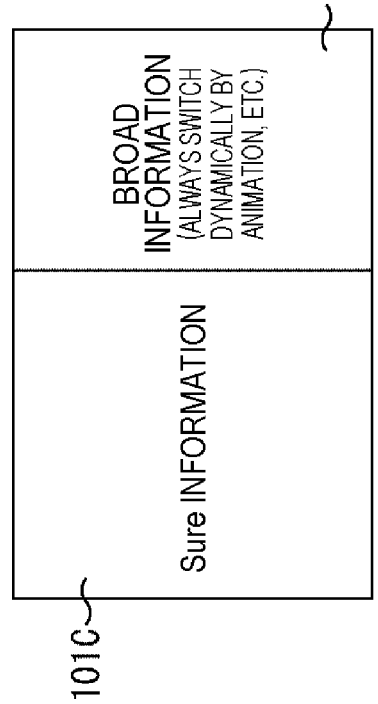
FIG. 11A
FIG. 11B
FIG. 11C
FIG. 11D

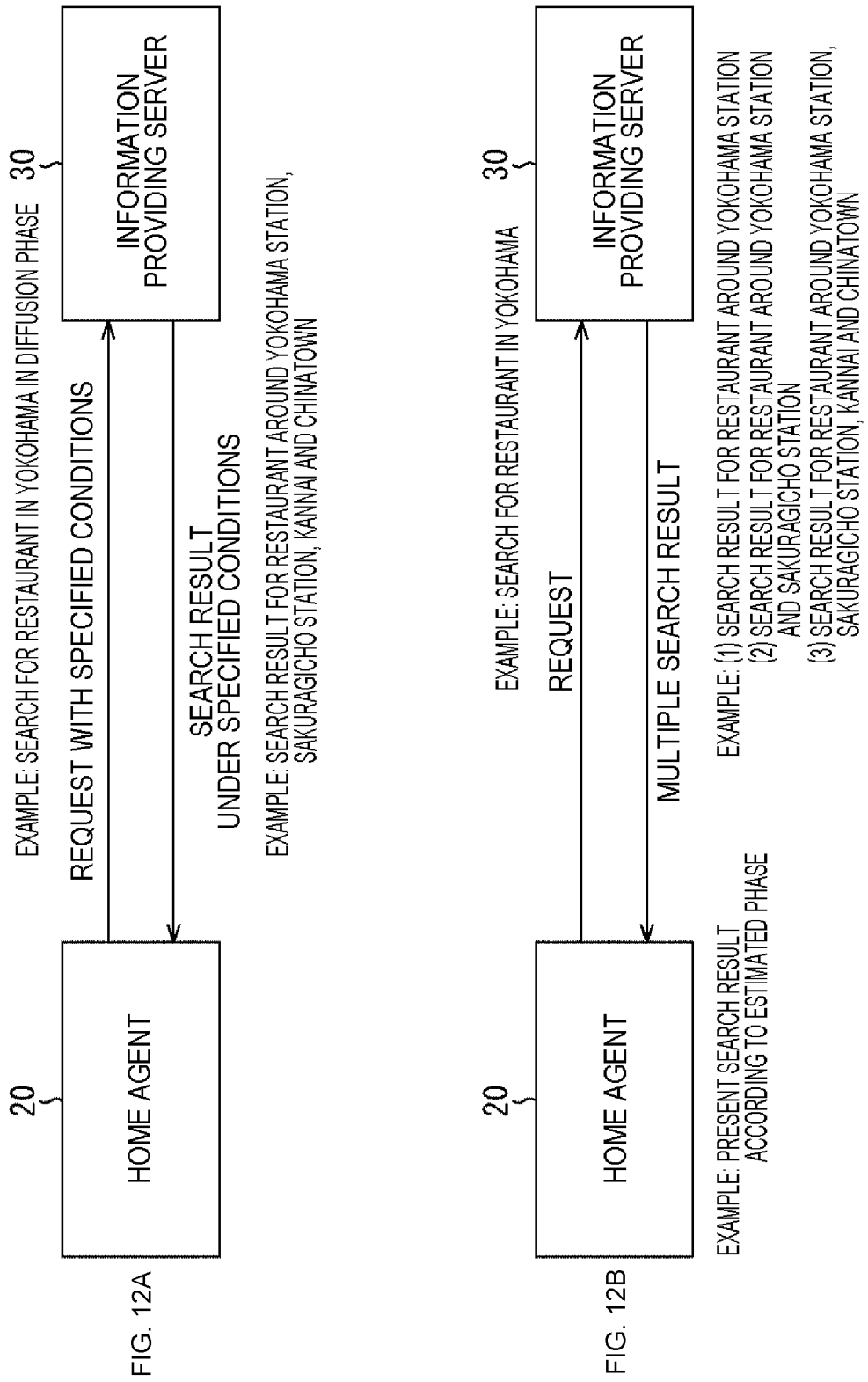

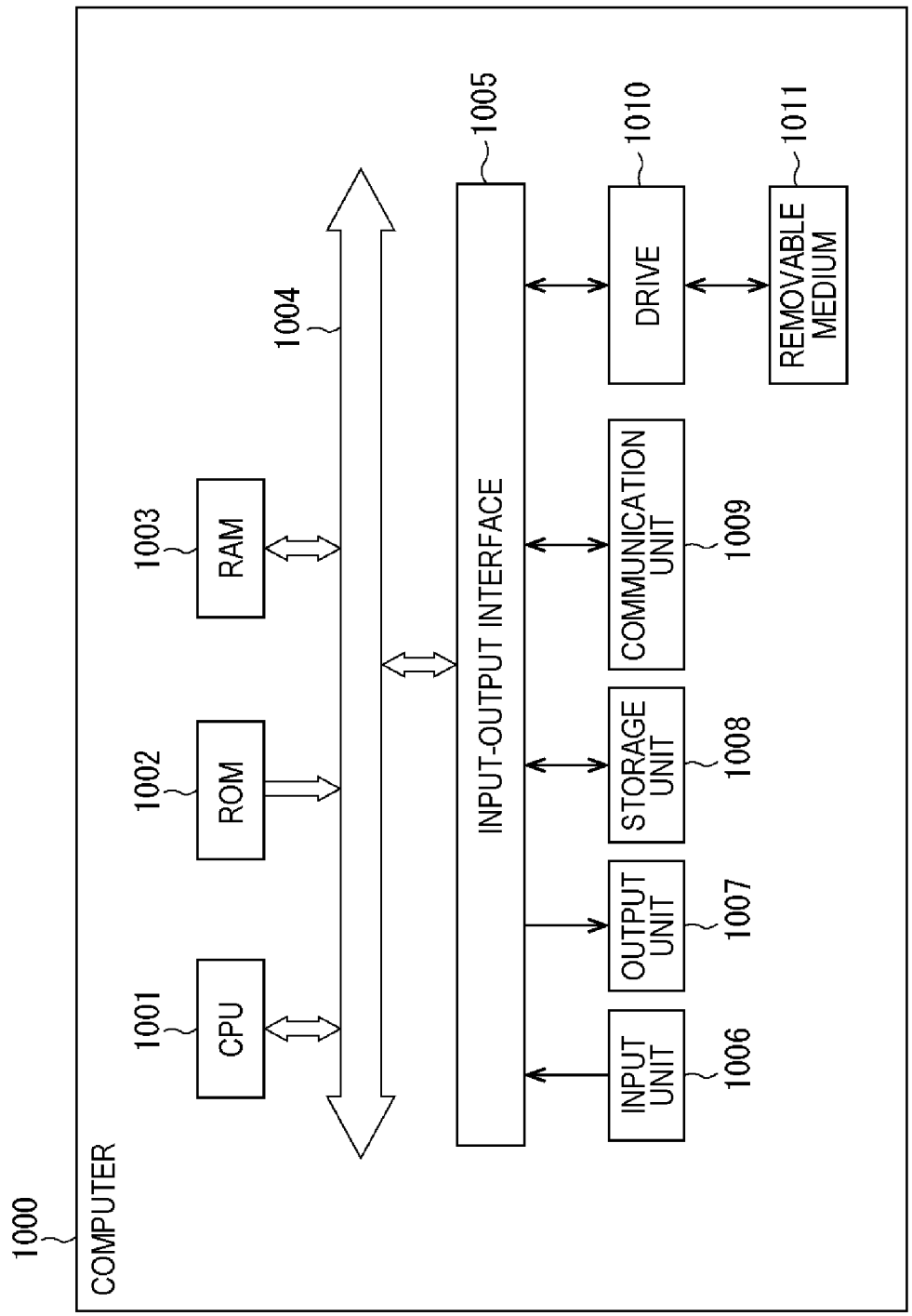

INFORMATION PROCESSING DEVICE AND INFORMATION PROCESSING METHOD FOR RESPONSE PRESENTATION

CROSS REFERENCE TO RELATED APPLICATIONS

This application is a U.S. National Phase of International Patent Application No. PCT/JP2019/045741 filed on Nov. 22, 2019, which claims priority benefit of Japanese Patent Application No. JP 2018-229666 filed in the Japan Patent Office on Dec. 7, 2018. Each of the above-referenced applications is hereby incorporated herein by reference in its entirety.

TECHNICAL FIELD

The present technology relates to an information processing device, an information processing method, and a program, and in particular to an information processing device, an information processing method, and a program that enable presentation of more appropriate response to a user.

BACKGROUND ART

In a voice dialogue system, a response according to a user's request utterance (intention) is presented to the user.

For example, Patent Document 1 discloses a voice dialogue system that switches a response according to a certainty factor of voice recognition.

CITATION LIST

Patent Document

Patent Document 1: Japanese Patent Application Laid-Open No. 2011-54088

SUMMARY OF THE INVENTION

Problems to be Solved by the Invention

In the voice dialogue system as described above, the range of request the user asks for is specified only when there is context, but since language has ambiguity, it is difficult for the system side to appropriately understand the user's intention.

In particular, in an early stage of the user's decision making process, it is necessary to broadly interpret the user's utterance and present a response, whereas conditions are narrowed toward the later stage, and therefore it is necessary to certainly identify the user's utterance and present a response.

The present technology has been made in view of such a situation, and makes it possible to present a more appropriate response to the user.

Solutions to Problems

An information processing device of the present technology includes: a phase estimation unit that estimates a phase regarding decision making of a user; and a response generation unit that generates a response to an utterance of the user according to the estimated phase.

An information processing method of the present technology performed by an information processing device includes: generating a response to an utterance of a user according to a phase regarding decision making of the user; and generating output information based on the generated response.

A program of the present technology is a program for causing a computer to perform processing including: generating a response to utterance of a user according to a phase regarding decision making of the user; and generating output information based on the generated response.

In the present technology, a response to an utterance of a user according to a phase regarding decision making of the user is generated, and output information based on the generated response is generated.

BRIEF DESCRIPTION OF DRAWINGS

FIGS. 11A, 11B, 11C, and 11D are diagrams showing a display example of output information.

FIGS. 12A and 12B are diagrams showing an example of a request according to the configuration of the voice dialogue system.

FIG. 16 is a block diagram showing a configuration example of a computer.

MODE FOR CARRYING OUT THE INVENTION

Figure 1:
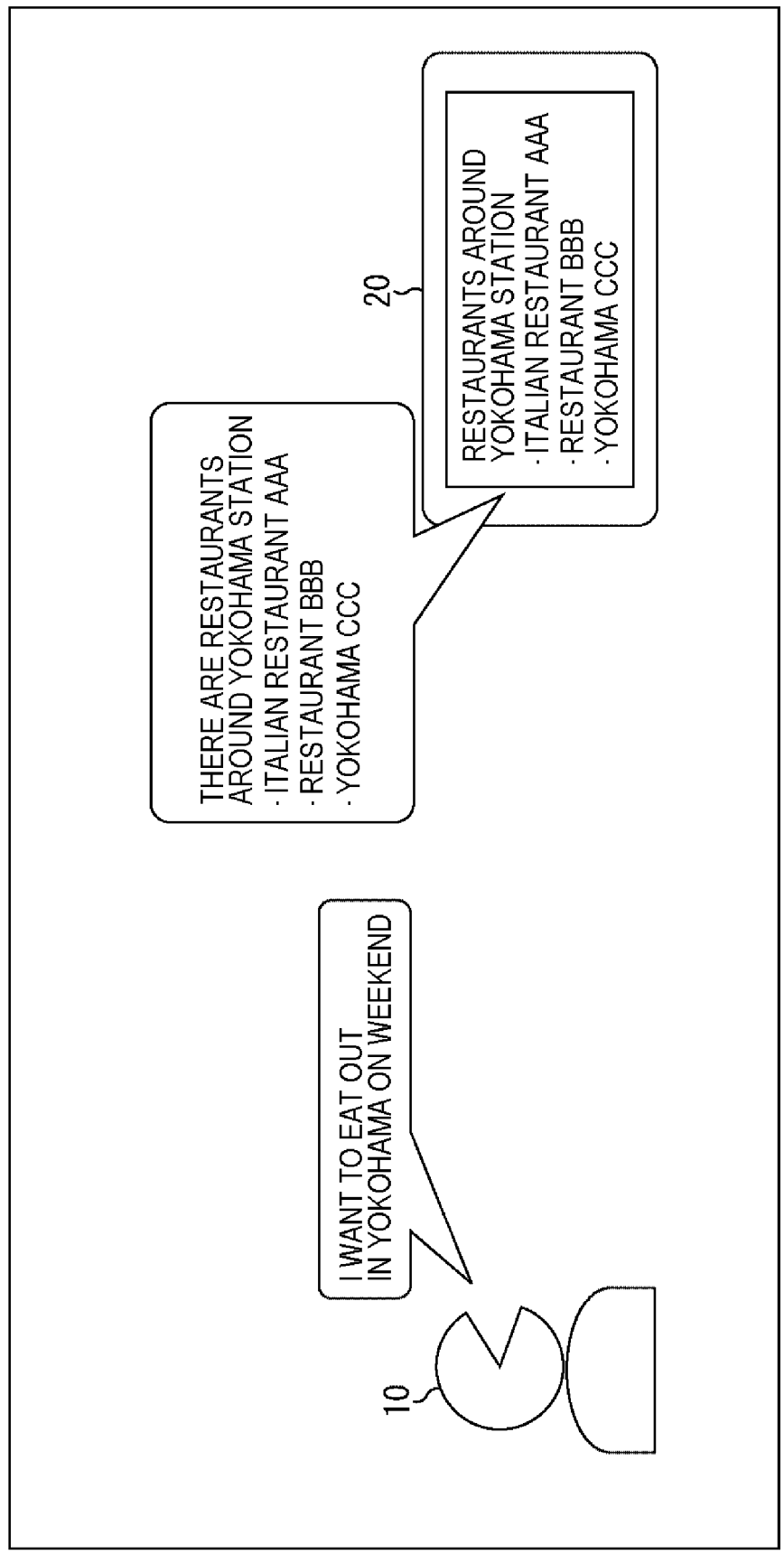
FIG. 1 is a diagram describing an outline of a voice dialogue system to which the present technology is applied.

A mode for carrying out the present technology (hereinafter referred to as embodiment) will be described below. Note that the description will be made in the following order.

1. Outline and configuration of voice dialogue system
2. Configuration and operation of home agent
3. Specific example and modification
4. Phase estimation using neural network.
5. Application to cloud computing
6. Configuration of computer

1. Outline and Configuration of Voice Dialogue System (Outline of Voice Dialogue System)

FIG. 1 is a diagram showing an outline of a voice dialogue system to which the present technology is applied.

FIG. 1 shows a user 10 and a home agent 20 that presents a response to an utterance of the user 10 as an information processing device to which the present technology is applied. The home agent 20 has a configuration as an interactive voice assistant device called a smart speaker and may have a simple display function. Note that the home agent 20 may have a configuration as a smart display having an excellent marking function in the smart speaker. The user 10 can acquire various information items by having a dialogue with the home agent 20.

In the example of FIG. 1, the user 10 utters, "I want to eat out in Yokohama on the weekend." In response thereto, by recognizing the utterance of the user 10 and performing a semantic analysis, the home agent 20 generates a response that there are three restaurants, "Italian restaurant AAA", "restaurant BBB", and "Yokohama CCC" around Yokohama Station, and presents the response by voice output and display.

Moreover, by estimating a decision making process of the user 10, the home agent 20 can change interpretation of the utterance of the user 10 and the response to present to the utterance.

Specifically, in a state where the user 10 is examining conditions and attributes, the home agent 20 broadly interprets the utterance of the user 10 and presents diffusive information, thereby enabling the user 10 to perform examination from various aspects. In other words, presenting a broad condition brings advantage that the user 10 is more likely to notice a condition the user 10 has not previously noticed. Furthermore, in a state where the user 10 narrows the condition, the home agent 20 identifies the utterance of the user 10 certainly and presents the narrowed information, thereby enabling the user 10 to promote decision making.

In such a search for information with unclear targets, the process of clarifying targets by narrowing the condition is disclosed in Mari Saito, Kazunori Omura, "A cognitive model of information search for user-unknown targets and structuralize processes of targets' attributes"<URL: http://www.interaction-ipsj.org/archives/paper1997/pdf1997/paper97-049.pdf>.

Furthermore, Mari S., Kazunori O., SIGIR '98, Proceedings of the 21st annual international ACM SIGIR conference on Research and development in information retrieval, Pages 155-163, "A cognitive model for searching for Ill-defined targets on the Web: the relationship between search strategies and user satisfaction" discloses results that user satisfaction is improved by carefully examining narrowing conditions.

That is, it can be said that more appropriate information is presented to the user by sufficiently examining the narrowing condition in the search for information with unclear targets.

Figure 2:
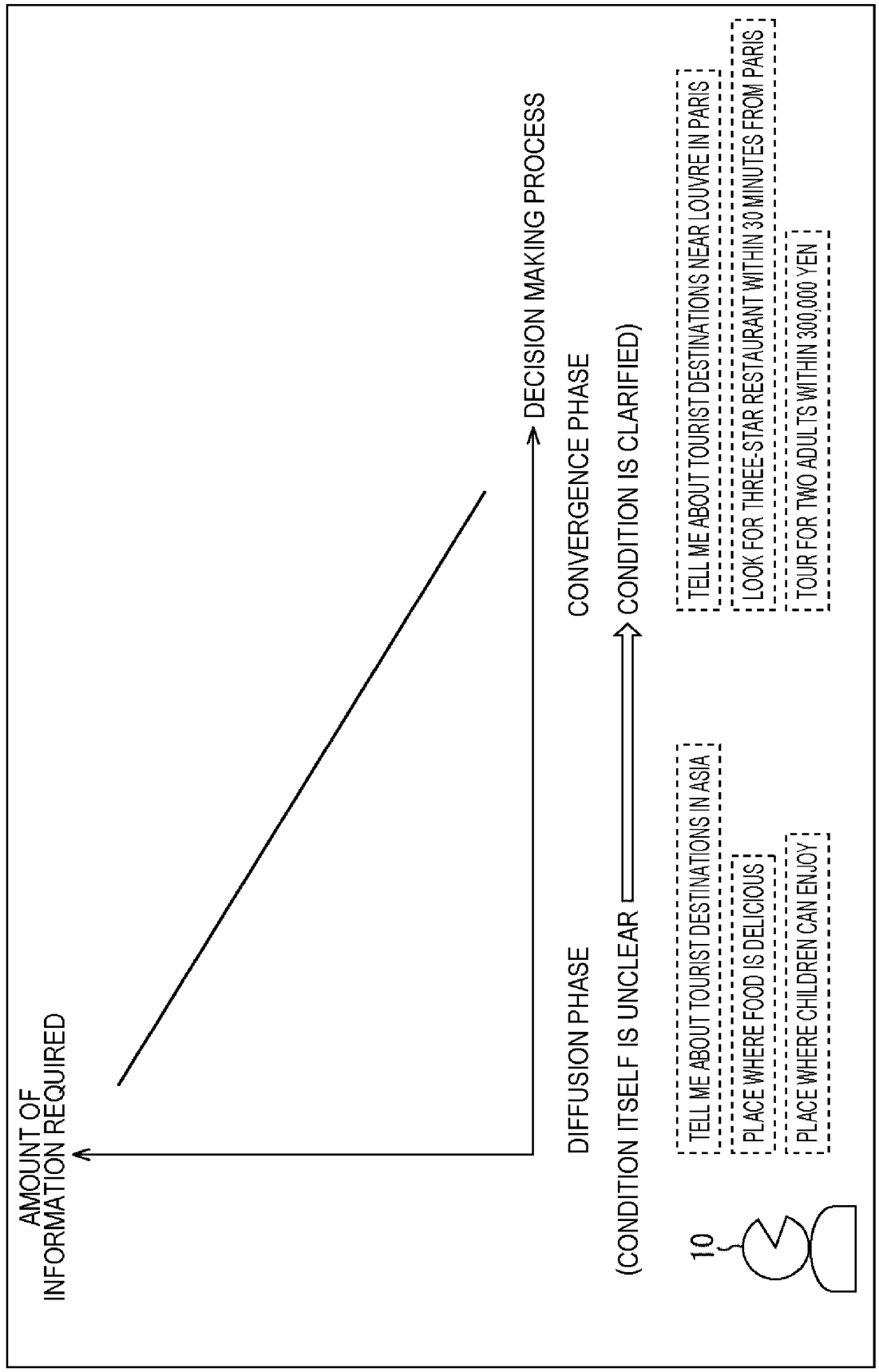
FIG. 2 is a diagram describing an amount of information according to a decision making process.

For example, as shown in FIG. 2, in a stage where the user 10 utters, "Tell me about tourist destinations in Asia", "Place where food is delicious", "Place where children can enjoy", and the like, since the condition itself is unclear, it is estimated that the decision making process is in a diffusion state. At this time, since the user 10 needs to present diffusive information, the amount of information required (information search range) becomes large (wide).

In a stage where the user 10 utters, "Tell me about tourist destinations near the Louvre in Paris", "Look for a three-star restaurant within 30 minutes from Paris", "Tour for two adults within 300,000 yen", and the like, since the condition has been clarified, it is estimated that the decision making process is in a convergence state. At this time, since it is necessary to present narrowed information to the user 10, the amount of information required (information search range) becomes small (narrow).

In the following, the decision making process (phase) in the diffusion state is referred to as a diffusion phase, and the decision making process (phase) in the convergence state is referred to as a convergence phase.

Figure 3:
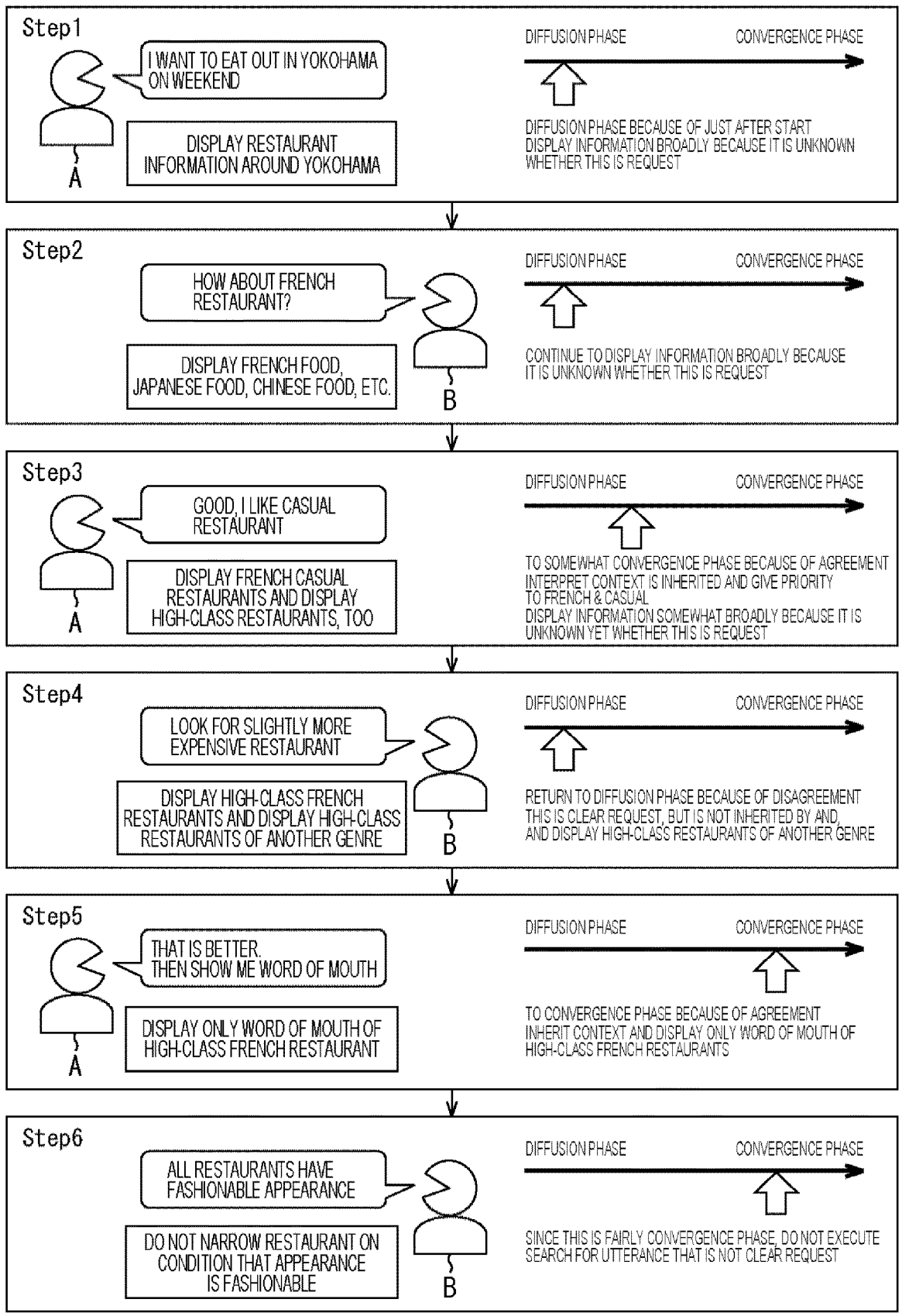
FIG. 3 is a diagram showing an example of response presentation according to phases.

(Example of Response Presentation According to Phase)
FIG. 3 is a diagram showing an example of response presentation according to the phase.

In the example of FIG. 3, in each step from step 1 to step 6, the phase is estimated for an utterance (dialogue) of two users A and B, and a response according to the estimated phase is presented.

In step 1, the user A utters, "I want to eat out in Yokohama on the weekend." Here, because of just after start of the dialogue, it is estimated that the phase is the diffusion phase. Furthermore, since it is unknown whether or not the utterance itself is a request to the home agent 20 (voice dialogue system), information is presented broadly. For example, restaurant information around Yokohama is searched for and presented.

In step 2, in response to the utterance of the user A in step 1, the user B utters, "How about a French restaurant?" In this stage as well, since it is unknown whether or not the utterance itself is a request, information is broadly presented continuously. For example, in addition to French food, information on restaurants such as Japanese food and Chinese food is searched for and presented.

In step 3, in response to the utterance of the user B in step 2, the user A utters, "Good, I like a casual restaurant." Here, it is estimated that the phase has transitioned to somewhat convergence phase because the two users agree. It is interpreted that the context from step 2 has been inherited, and while information on "French & casual" is prioritized, it is unknown whether or not the utterance itself is a request, and thus information is presented somewhat broadly. For example, in addition to French (French food) casual restaurants, information on high-class restaurants is searched for and presented.

In step 4, the user B utters, "Look for a slightly more expensive restaurant" in response to the information presented in step 3. Here, it is estimated that the two users disagree and the phase returns to the diffusion phase. Although the utterance itself is a clear request, the context is not inherited and information on high-class restaurants of another genre is presented. For example, in addition to French (French food) high-class restaurants, information on high-class restaurants of another genre is searched for and presented.

In step 5, in response to the utterance of the user B in step 4, the user A utters, "That is better. Then, show me the word of mouth." Here, it is estimated that the phase has transitioned to the convergence phase because the two users agree. The context is inherited and only the word of mouth of the high-class French restaurant (French food) is searched for and presented according to the request utterance.

In step 6, the user B utters, "All restaurants have fashionable appearance" in response to the information presented in step 5. Here, since the phase has fairly transitioned to the convergence phase side, a search is not executed for an utterance that is not a clear request (information is not narrowed only on condition that "appearance is fashionable").

In this way, in the voice dialogue system to which the present technology is applied, the decision making process (phase) of the user 10 is estimated, and information according to the estimated phase is searched for.

(Configuration of Voice Dialogue System)

Figure 4:
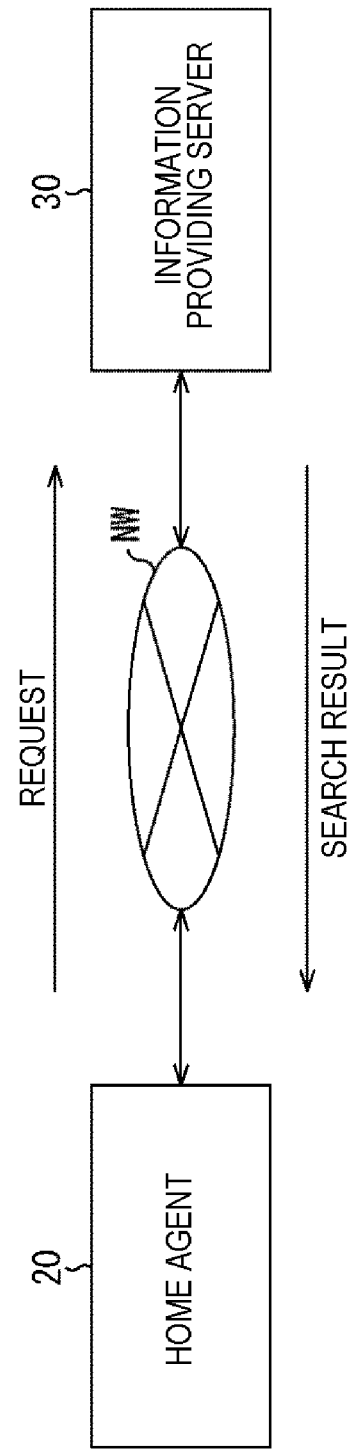
FIG. 4 is a block diagram showing a configuration example of the voice dialogue system.

FIG. 4 is a block diagram showing a configuration example of the voice dialogue system described above.

The voice dialogue system of FIG. 4 includes the home agent 20 and an information providing server 30. The home agent 20 and the information providing server 30 are connected to each other via a network NW such as the Internet.

The home agent 20 transmits a request based on the utterance of the user 10 to the information providing server 30.

The information providing server 30 provides various information items to the home agent 20 in cooperation with a database having a huge amount of information. The information providing server 30 executes a search according to the request from the home agent 20 and transmits a search result thereof to the home agent 20.

The home agent 20 generates a response to the utterance of the user 10 on the basis of the search result from the information providing server 30 and presents the response to the user 10.

In the following, details of the home agent 20 that implements the above-described voice dialogue system will be described.

2. Configuration and Operation of Home Agent (Hardware Configuration Example of Home Agent)

Figure 5:
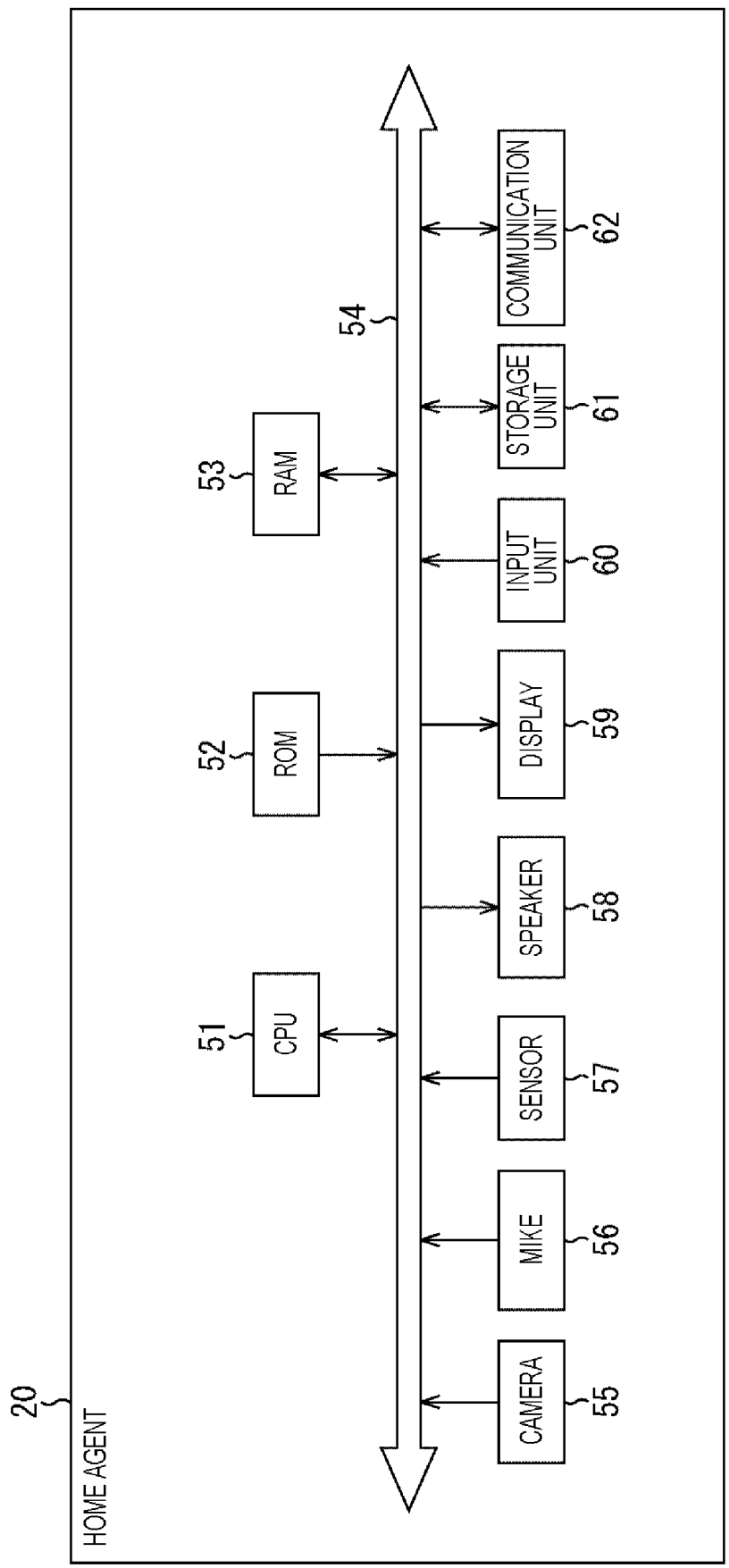
FIG. 5 is a block diagram showing a hardware configuration example of a home agent.

FIG. 5 is a block diagram showing a hardware configuration example of the home agent 20 to which the present technology is applied.

A central processing unit (CPU) 51, a read only memory (ROM) 52, and a random access memory (RAM) 53 are connected to each other by a bus 54.

A camera 55, a microphone (hereinafter referred to as a mike) 56, a sensor 57, a speaker 58, a display 59, an input unit 60, a storage unit 61, and a communication unit 62 are connected to the bus 54.

The camera 55 includes a solid-state image capturing device such as a complementary metal oxide semiconductor (CMOS) image sensor or a charge coupled device (CCD) image sensor, and acquires an image by capturing an image of the user 10 and a surrounding environment thereof.

The mike 56 acquires voice such as the utterance of the user 10.

The sensor 57 includes various sensors such as a motion sensor or a vital sensor. For example, the sensor 57 detects presence or absence of a person (user 10) and biological information such as the pulse or respiration of the person.

The speaker 58 outputs voice (synthetic voice).

The display 59 includes a liquid crystal display (LCD), an organic electro luminescence (EL) display, or the like.

The input unit 60 includes a touch panel provided over the display 59 or various buttons provided on a housing of the home agent 20. The input unit 60 detects operations by the user 10 and outputs information indicating details of the operations.

The storage unit 61 includes a non-volatile memory or the like. The storage unit 61 stores various data such as data for voice synthesis in addition to the program executed by the CPU 51.

The communication unit 62 includes a network interface or the like. The communication unit 62 performs wireless or wired communication with an external device.

(Functional Configuration Example of Home Agent)

Figure 6:
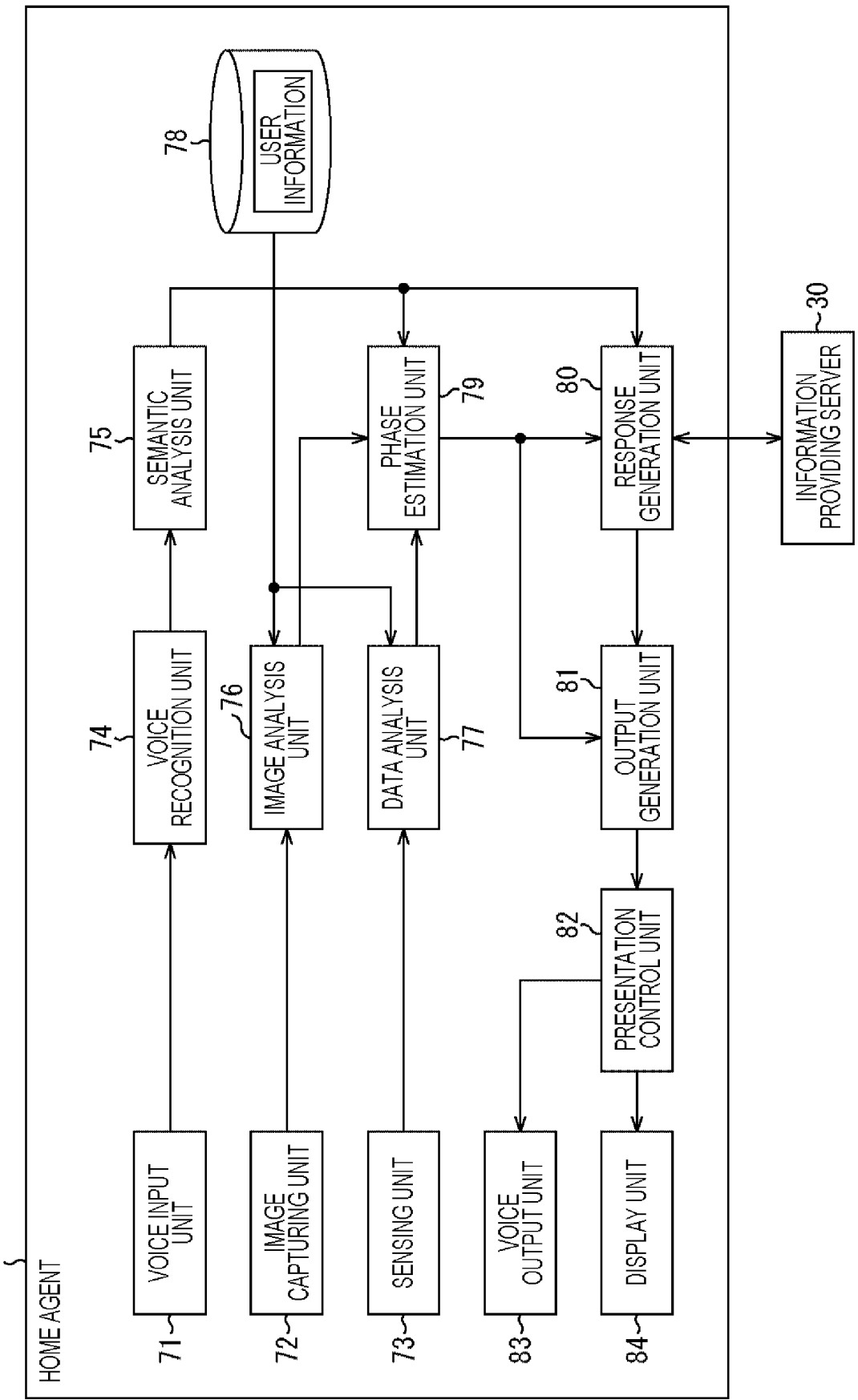
FIG. 6 is a block diagram showing a functional configuration example of the home agent.

FIG. 6 is a block diagram showing a functional configuration example of the home agent 20.

A part of functional blocks of the home agent 20 shown in FIG. 6 is implemented by executing a predetermined program by the CPU 51 of FIG. 5.

The home agent 20 includes a voice acquisition unit 71, an image capturing unit 72, a sensing unit 73, a voice recognition unit 74, a semantic analysis unit 75, an image analysis unit 76, a data analysis unit 77, a storage unit 78, a phase estimation unit 79, a response generation unit 80, an output generation unit 81, a presentation control unit 82, a voice output unit 83, and a display unit 84.

The voice acquisition unit 71 corresponds to the mike 56 of FIG. 5 and acquires the utterance of the user 10 (uttered voice). The acquired uttered voice (voice data) is supplied to the voice recognition unit 74.

The image capturing unit 72 corresponds to the camera 55 of FIG. 5 and captures an image of the user 10. The image obtained by the image capturing (image data) is supplied to the image analysis unit 76.

The sensing unit 73 corresponds to the sensor 57 of FIG. 5 and performs sensing in an environment around the user 10. Sensing data obtained by the sensing is supplied to the data analysis unit 77.

The voice recognition unit 74 performs voice recognition on the voice data from the voice acquisition unit 71 by using a voice recognition engine (not shown). A character string obtained by the voice recognition is supplied to the semantic analysis unit 75.

The semantic analysis unit 75 performs natural language processing, specifically, semantic analysis, on a sentence including the character string from the voice recognition unit 74. The semantic analysis identifies utterance contents (intention, context (dialogue context), proper noun, and the like) of the user 10. A result of the semantic analysis is supplied to the phase estimation unit 79 and the response generation unit 80.

The image analysis unit 76 performs image analysis on the image data from the image capturing unit 72. For example, a profile of the user 10 is specified by face authentication using user information stored in the storage unit 78. A result of the image analysis is supplied to the phase estimation unit 79.

The data analysis unit 77 performs data analysis on the sensing data from the sensing unit 73. For example, a state of the user 10 is specified by the data analysis using information stored in the storage unit 78. A result the data analysis is supplied to the phase estimation unit 79.

The storage unit 78 corresponds to the storage unit 61 of FIG. 5 and stores various data such as user information.

The phase estimation unit 79 estimates the phase of the user 10 (decision making process) on the basis of the result of the semantic analysis from the semantic analysis unit 75, the result of the image analysis from the image analysis unit 76, and the result of the data analysis from the data analysis unit 77. Information representing the estimated phase is supplied to the response generation unit 80 and the output generation unit 81.

The response generation unit 80 generates a response to the utterance of the user 10 according to the estimated phase on the basis of the result of the semantic analysis from the semantic analysis unit 75 and the information from the phase estimation unit 79. Specifically, the response generation unit 80 generates a query based on the utterance of the user 10 according to the estimated phase, and transmits the query to the information providing server 30 via the communication unit 62 (FIG. 5). The response generation unit 80 receives a search result based on the transmitted query from the information providing server 30 via the communication unit 62 (FIG. 5). With this operation, the response generation unit 80 generates the response to the utterance of the user 10. The generated response is supplied to the output generation unit 81.

The output generation unit 81 generates output information to be presented to the user 10 on the basis of the response from the response generation unit 80 and the information from the phase estimation unit 79. The generated output information is supplied to the presentation control unit 82.

The presentation control unit 82 controls presentation of the output information from the output generation unit 81. The output information is presented to the voice output unit 83 and the display unit 84, which have a configuration as a presentation unit, by voice output and display.

The voice output unit 83 corresponds to the speaker 58 of FIG. 5, and outputs the output information by voice by the control of the presentation control unit 82.

The display unit 84 corresponds to the display 59 of FIG. 5, and displays the output information by the control of the presentation control unit 82.

(Flow of Response Presentation Process)

Next, the flow of response presentation process by the home agent 20 (voice dialogue system) will be described with reference to the flowchart of FIG. 7.

In step S11, the voice acquisition unit 71, the image capturing unit 72, and the sensing unit 73 acquire the user's utterance, image, and sensing data, respectively.

In step S12, the voice recognition unit 74 performs voice recognition on the user's utterance, and the semantic analysis unit 75 performs semantic analysis.

In step S13, the image analysis unit 76 and the data analysis unit 77 perform user recognition and situation recognition on the basis of the user's image and sensing data.

For example, the image analysis unit 76 acquires the user's profile by using the image data from the image capturing unit 72 and the user information stored in the storage unit 78. The user's profile includes, for example, a restaurant reservation history and usage history as a user's action history.

Furthermore, the data analysis unit 77 acquires the user's state by using the sensing data from the sensing unit 73 and the user information stored in the storage unit 78. The user's state includes presence or absence of the user's dialogue partner, the user's surrounding environment, the direction of the user's line of sight, and the like.

In step S14, the phase estimation unit 79 estimates the phase on the basis of at least one of the user's utterance and context (result of semantic analysis), the user's profile, and the user's state from the semantic analysis unit 75, the image analysis unit 76, and the data analysis unit 77, respectively.

For example, in a case where a plurality of users disagrees with each other, or in a case where a new condition or attribute is added in the utterance or the condition is changed frequently, it is estimated that the phase is the diffusion phase. Meanwhile, in a case where a plurality of users agrees with each other, or in a case where a new condition or attribute is not added in the utterance or the condition is changed infrequently, it is estimated that the phase is the convergence phase.

Furthermore, as a search condition, in a case where there are many OR searches or in a case where information that is not high in the search result is referenced (becomes a candidate), it is estimated that the phase is the diffusion phase. Meanwhile, as the search condition, in a case where there are many AND searches or in a case where information that is high in the search result is referenced, it is estimated that the phase is the convergence phase.

Moreover, in a case where there are many chats, or in a case where the utterance speed is slow (there is a gap, thinking), it is estimated that the phase is the diffusion phase, and in a case where there are few chats, or in a case where the utterance speed is fast, it is estimated that the phase is the convergence phase.

In step S15, the response generation unit 80 generates a query based on the user's utterance according to the phase estimated by the phase estimation unit 79.

Specifically, the response generation unit 80 changes interpretation of the user's utterance according to the estimated phase to generate a query based on a result of the interpretation.

For example, the response generation unit 80 changes a range in which to determine an unclear part of voice recognition according to the phase. Specifically, in a case where it is estimated that the phase is the diffusion phase, importance is attached to recall such that possible candidates are widely recognized. Meanwhile, in a case where it is estimated that the phase is the convergence phase, importance is attached to precision such that information is narrowed to a candidate with a high certainty factor and recognized.

Furthermore, the response generation unit 80 changes the operation in a case where it is unknown whether or not the utterance is a request as a result of the semantic analysis according to the phase. Specifically, in a case where it is estimated that the phase is the diffusion phase, the utterance that is unknown whether or not the utterance is a request is also accepted. Meanwhile, in a case where it is estimated that the phase is the convergence phase, only the utterance that is clearly a request is accepted.

Moreover, the response generation unit 80 changes the operation in a case where it is unknown whether or not the utterance is an utterance to the home agent 20 or a dialogue between users according to the phase. Specifically, in a case where it is estimated that the phase is the diffusion phase, the utterance is picked up as much as possible such that relevant information is searched for. Meanwhile, in a case where it is estimated that the phase is the convergence phase, information is searched for only when the utterance is clearly aimed at the home agent 20.

Furthermore, the response generation unit 80 determines whether or not to inherit the context according to the phase. Specifically, in a case where it is estimated that the phase is the diffusion phase, by inheriting the context, the inherited condition is prioritized, while information other than the inherited condition and supplementary information are searched for (AND search with the previous utterance contents). Meanwhile, in a case where it is estimated that the phase is the convergence phase, by inheriting the context, the information is searched for according to the inherited condition only, and the search result is displayed.

Figure 8:
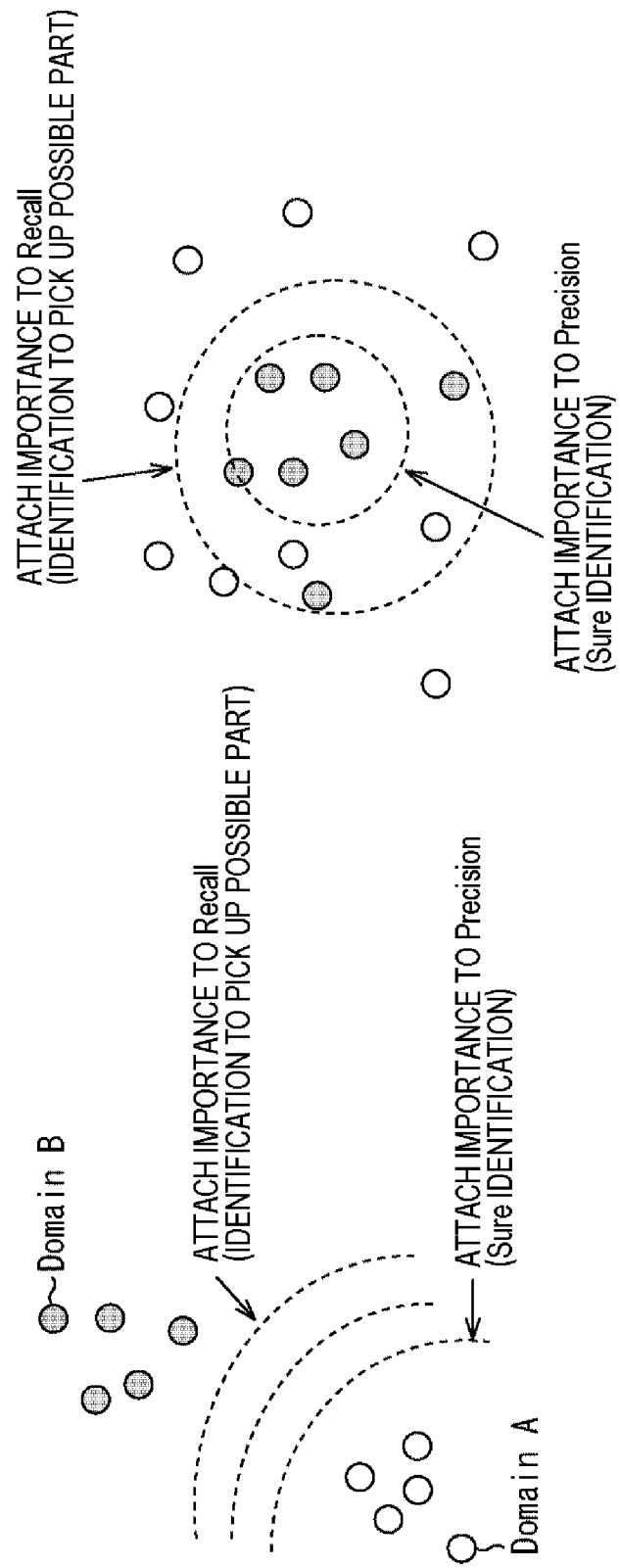
FIGS. 8A and 8B are diagrams describing level setting in an identification problem.

FIGS. 8A and 8B are diagrams describing level setting in an identification problem as described above.

The case FIG. 8A shows an example of identifying a domain A as an identification target.

In the example of case A, a boundary line of level in which importance is attached to precision (perform sure identification) and a boundary line of level in which importance is attached to recall (perform identification of picking up a possible part) are set in three stages. In the example of case A, even in the recall-focused diffusion phase, let alone in the precision-focused convergence phase, elements of a domain B are out of the identification target.

The case FIG. 8B shows an example of identifying the domain B as an identification target.

In the example of case B, the boundary line of level in which importance is attached to precision (perform sure identification) and the boundary line of level in which importance is attached to recall (perform identification of picking up a possible part) are set in two stages. In the example of case B, in the precision-focused convergence phase, only elements of the domain B are an identification target, but in the recall-focused diffusion phase, in addition to the elements of the domain B, some elements of the domain A are included in the identification target.

As described above, the level of determining interpretation of the user's utterance can be set according to the estimated phase.

Furthermore, the response generation unit 80 generates a query with a search range according to the phase estimated by the phase estimation unit 79.

Specifically, in a case where it is estimated that the phase is the diffusion phase, as an attribute that serves as a search key (condition), a query to search for information other than the specified attribute is generated. For example, in a case where music is search for, when jazz is specified, a query to execute search by a specific period or by a specific vocalist is generated.

Meanwhile, in a case where it is estimated that the phase is the convergence phase, as an attribute that serves as a search key, a query to search for only information with the specified attribute is generated.

Furthermore, in a case where it is estimated that the phase is the diffusion phase, as an attribute value (search range), a query to search for information other than the specified attribute may be generated. For example, in a case where a restaurant is searched for, when a restaurant in Shibuya is specified, a query to search for a restaurant in an area near Shibuya, such as Ebisu and Daikanyama, is generated.

As described above, if interpretation of the user's utterance is determined according to the phase and the query based on the result of the interpretation is set, the process proceeds to step S16.

In step S16, the information providing server 30 executes a search on the basis of the query generated by the response generation unit 80, and supplies the result to the response generation unit 80. The response generation unit 80 generates a response to the user's utterance on the basis of the search result from the information providing server 30.

That is, in the diffusion phase, the response generation unit 80 generates the response that broadly interprets the user's utterance, and in the convergence phase, the response generation unit 80 generates the response that certainly interprets (identifies) the user's utterance.

In step S17, the output generation unit 81 determines a presentation method of the response according to the phase estimated by the phase estimation unit 79, and generates output information based on the response generated by the response generation unit 80.

The output generation unit 81 determines the number of responses to be presented by the presentation method determined according to the estimated phase.

For example, in a case where it is estimated that the phase is the diffusion phase, more information is presented according to the search result based on the query. For example, relevant information from various viewpoints such as restaurant business hours, address (map information), price range, appearance photograph, and word of mouth may be presented. Furthermore, as the relevant information, a search result based on a query to search for information other than the specified attribute or information other than the attribute value, that is, a search result under the condition that the user does not clearly utters (condition other than the condition specified by request utterance) may be additionally presented.

Meanwhile, in a case where it is estimated that the phase is the convergence phase, according to the search result based on the query, only the generated response such as information that matches the specified condition and minimum information is presented.

Furthermore, the output generation unit 81 may determine whether the response is presented by display or voice output by the presentation method determined according to the estimated phase. In particular, in a case where the response is presented by display, placement of the response on the display may be determined by the presentation method.

In step S18, the presentation control unit 82 causes the voice output unit 83 and the display unit 84, which have a configuration as a presentation unit, to present the output information generated by the output generation unit 81 by voice output and display.

As described above, the response presentation process by the home agent 20 (voice dialogue system) is performed.

Here, with reference to FIG. 9, a flow from the user's utterance to the response presentation corresponding to the response presentation process described above will be described. Here, step 1 in the response presentation described with reference to FIG. 3 will be illustrated and described.

Figure 7:
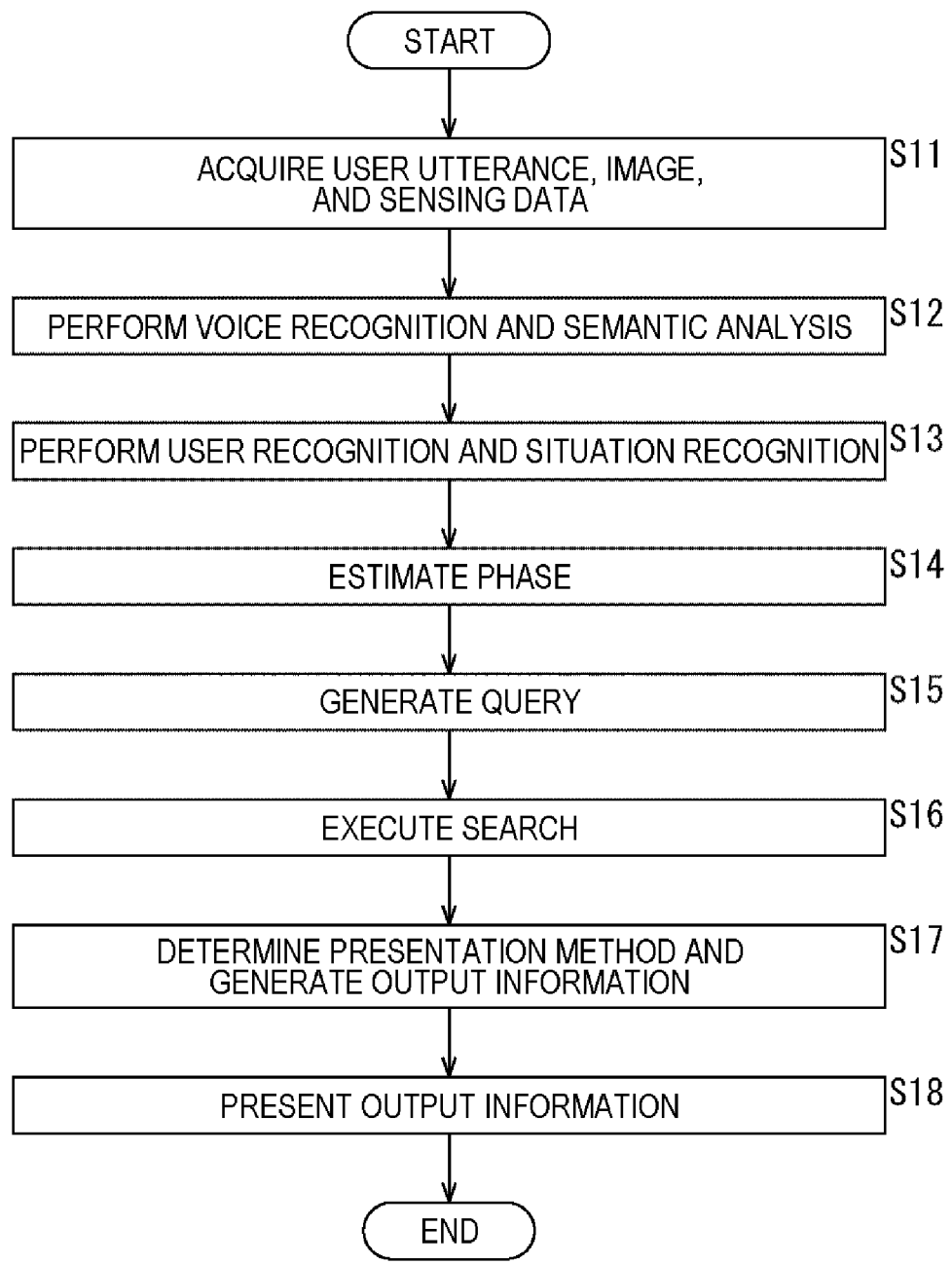
FIG. 7 is a flowchart describing a flow of a response presentation process.
Figure 9:
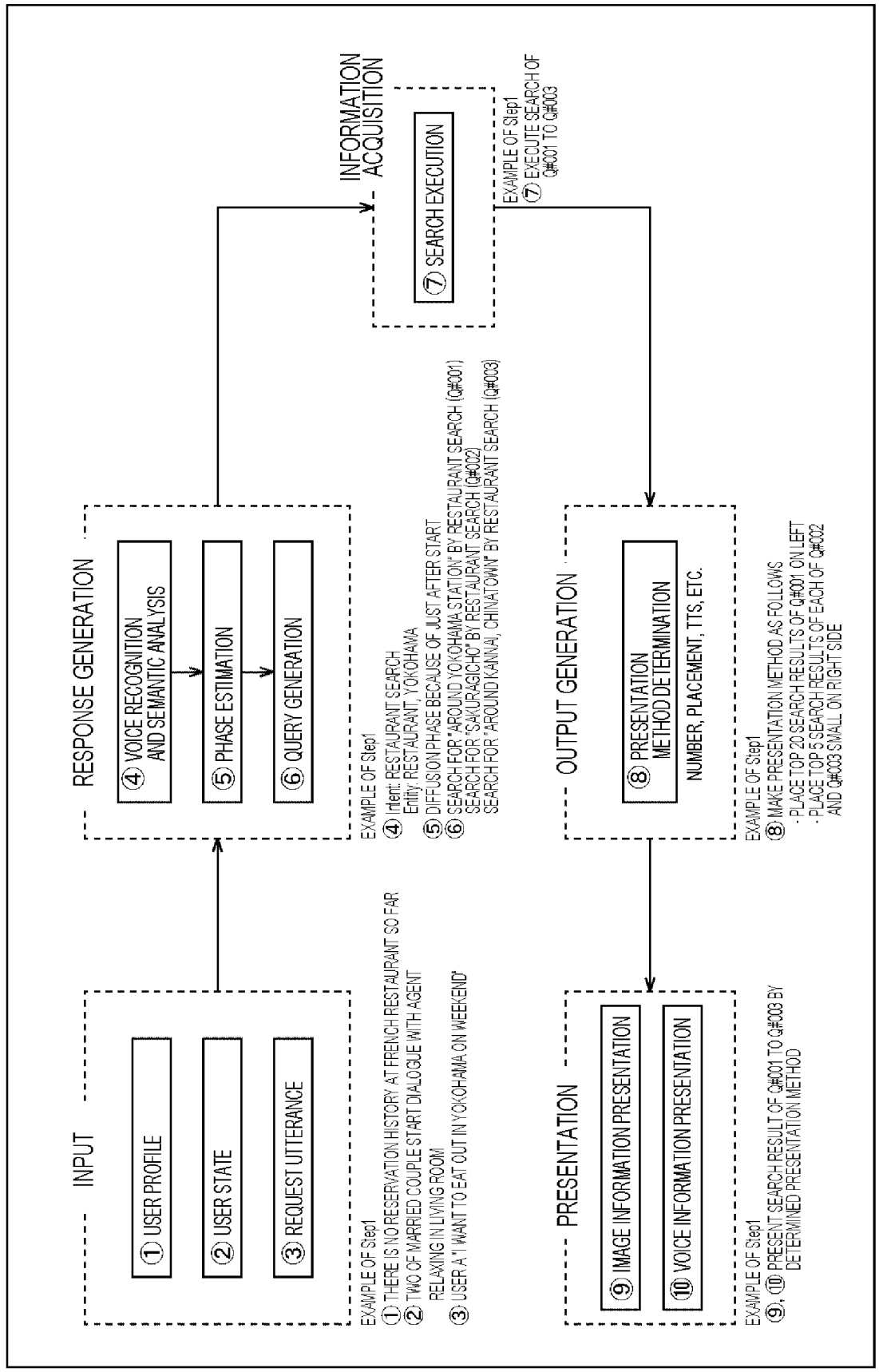
FIG. 9 is a diagram describing a flow from user's utterance to response presentation.

FIG. 9 shows five steps of "input", "response generation", "information acquisition", "output generation", and "presentation." The input step corresponds to step S11 of FIG. 7, the response generation step corresponds to steps S12 to S15 of FIG. 7, and the information acquisition corresponds to step S16 of FIG. 7. Furthermore, the output generation step corresponds to step S17 of FIG. 7, and the presentation step corresponds to step S18 of FIG. 7.

In the input step, the user profile indicated by the number 1 in parentheses, the user state indicated by the number 2 in parentheses, and the request utterance indicated by the number 3 in parentheses are entered.

In the input step, in the example of step 1 of FIG. 3, the user profile is entered as information that there has never been a reservation history at a French restaurant. The user state is entered as information that two of a married couple (users A and B) have started a dialogue with the home agent 20 and information that the two users are relaxing in a living room. The request utterance is entered as an utterance by the user A, "I want to eat out in Yokohama on the weekend."

In the response generation step, each process of voice recognition and semantic analysis indicated by the number 4 in parentheses, phase estimation indicated by the number 5 in parentheses, and query generation indicated by the number 6 in parentheses is performed.

In the response generation step, in the example of step 1 of FIG. 3, the intent is determined as "restaurant search" by voice recognition and semantic analysis, and the entity is determined as "restaurant" and "Yokohama." According to the phase estimation, it is estimated that the phase is the diffusion phase because of just after the start of the dialogue. According to the query generation, a query Q #001, which is a search for "around Yokohama Station" by restaurant search, a query Q #002, which is a search for "Sakuragicho"

by restaurant search, and a query Q #003, which is a search for "around Kannai, Chinatown" by restaurant search are generated.

In the information acquisition step, a search is executed as indicated by the number 7 in parentheses.

In the information acquisition step, in the example of step 1 of FIG. 3, the search of the queries Q #001 to Q #003 is executed.

In the output generation step, the presentation method is determined as indicated by the number 8 in parentheses. Here, the number of responses presented, placement, type of text-to-speech (TTS), and the like are determined.

In the output generation step, in the example of step 1 of FIG. 3, as the presentation method, placement of top 20 search results of the query Q #001 on the left side of the screen, and placement of top 5 search results of the queries Q #002 and Q #003 small on the right side of the screen are determined.

In the presentation step, presentation of image information indicated by the number 9 in parentheses, and presentation of voice information indicated by the number 10 in parentheses are performed.

In the presentation step, in the example of step 1 of FIG. 3, the search result of the queries Q #001 to Q #003 is presented by the determined presentation method.

Figure 10:
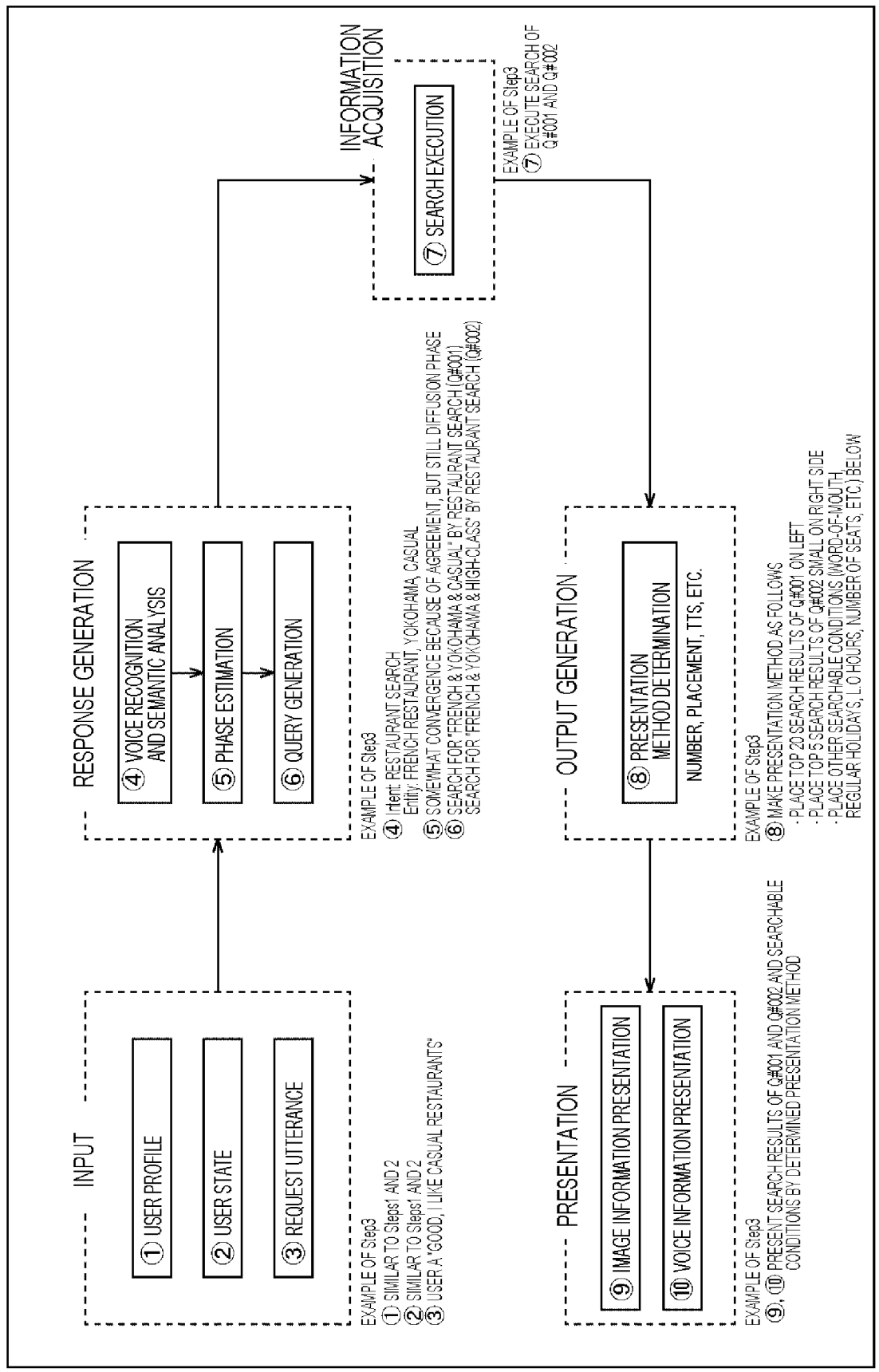
FIG. 10 is a diagram describing a flow from user's utterance to response presentation.

Next, a flow from the user's utterance to the response presentation will be described with reference to FIG. 10 while exemplifying step 3 in the response presentation described with reference to FIG. 3.

In the input step, in the example of step 3 of FIG. 3, the user profile and the user state are similar to the example of FIG. 9. The request utterance is entered as the utterance by the user A, "Good, I like casual restaurants."

In the response generation step, in the example of step 3 of FIG. 3, the intent is determined as "restaurant search" by voice recognition and semantic analysis, and the entity is determined as "French restaurant", "Yokohama", and "casual." According to the phase estimation, since the two users agree with each other, the phase has somewhat transitioned to the convergence phase, but it is estimated that the phase is still the diffusion phase. Then, according to the query generation, a query Q #001, which is a search for "French & Yokohama & casual" by restaurant search, and a query Q #002, which is a search for "French & Yokohama & casual" by restaurant search are generated.

In the information acquisition step, in the example of step 3 of FIG. 3, the search by the queries Q #001 and Q #002 is executed.

In the output generation step, in the example of step 3 of FIG. 3, as the presentation method, placement of top 20 search results of the query Q #001 on the left side of the screen, and placement of top five search results of the query Q #002 small on the right side of the screen are determined. Moreover, it is determined to place other searchable conditions (word-of-mouth, regular holidays, last order time, number of seats, and the like) at the bottom of the screen.

In the presentation step, in the example of step 3 of FIG. 3, the search result of the queries Q #001 and Q #002 and searchable conditions are presented by the determined presentation method.

According to the above process, the user's decision making process (phase) is estimated, and the response according to the estimated phase is generated, and therefore it is possible to present a more appropriate response to the user.

Specifically, in a state where the user is examining conditions and attributes, the user's utterance is broadly interpreted and diffusive information is presented, enabling the user to perform examination from various aspects.

Furthermore, in a state where the user narrows the condition, the user's utterance is certainly interpreted and narrowed information is presented, enabling promotion of user's decision making. As a result, it is possible to present information the user is satisfied with.

3. Specific Example and Modification

Hereinafter, specific examples and modifications of each process in the above-described response presentation process will be described.

(Display Example of Output Information)

FIGS. 11A, 11B, 11C, and 11D are diagrams showing a display example of the output information (response) on the display unit 84. In the example of FIGS. 11A, 11B, 11C, and 11D, both sure information corresponding to the convergence phase and broad information corresponding to the diffusion phase are displayed as the output information.

In the display example FIG. 11A, sure information is displayed in a relatively small area 101A on the upper left of the display screen, and broad information is displayed in the other area 102A.

In the display example FIG. 11B, sure information is displayed in an area 101B occupying about ⅔ of the upper left of the display screen, and broad information is displayed in the other area 102B. Detailed information including an image or the like is displayed in the area 101B. Meanwhile, non-detailed information such as text is displayed in the area 102B.

In the display example FIG. 11C, sure information is displayed in an area 101C occupying about 60% of the upper left of the display screen, and broad information is displayed in the other area 102C. Information that is always dynamically switched by animation or the like is displayed in the area 102C.

In the display example FIG. 11D, sure information is displayed in an area 101D occupying about 60% of the left side of the display screen near an utterer, and broad information is displayed in an area 102D occupying about 40% of the right side of the display screen near a partner of the utterer.

In this way, in a case where both sure information and broad information are displayed, placement and size on the display screen may be different.

(Information Presentation by Different Presentation Method)

Furthermore, the presentation method may be different between the information according to the convergence phase and the information according to the diffusion phase.

For example, in a case where a straightforward response is possible, sure information corresponding to the convergence phase is presented by voice output, while broad information corresponding to the diffusion phase is presented by display.

Furthermore, sure information corresponding to the convergence phase may be presented to an utterer who makes a clear request, and broad information corresponding to the diffusion phase may be presented to others on the spot.

Moreover, on the basis of the line of sight of the user (utterer), sure information may be presented to an utterance of a person who is not looking at the display screen, and broad information may be presented to an utterance of a person who is looking at the display screen.

(Phase Estimation According to User State)

The phase may be estimated according to user's characteristics. For example, in a case where an utterer is visually impaired, the utterer cannot supplement information by a modal other than voice, and therefore it is estimated that the phase is the convergence phase. In this case, sure information is presented by voice output.

Furthermore, the phase may be estimated according to the number of users. For example, in a case where there is a plurality of users, it is estimated that the phase is the convergence phase. Therefore, sure information is presented, and it is possible to inhibit spouting caused by conversation between the users (operation that the system side picks up an utterance the user does not intend to enter). Meanwhile, in a case where there is only one user, it is estimated that the phase is the diffusion phase. Therefore, broad information is presented, and the utterance is broadly recognized even in a case where there is no dialogue partner, thereby broadening the range of consideration of the user.

(Response Generation According to Dialogue Context)

Response generation (information search) may be performed according to the current dialog context.

Specifically, for the intent that match the current dialog context (corresponding to the domain of FIGS. 8A and 8B), a recall-focused information search is executed, and for the intent that does not match the current dialog context (domain), a precision-focused information search is executed.

For example, in a dialog context looking for a restaurant in Yokohama (going out information domain), in a case where a request utterance looking for an event in Yokohama (going out information domain) occurs, tourist destination information other than Yokohama event information and information other than Yokohama are searched for.

Meanwhile, in the dialog context looking for a restaurant in Yokohama (going out information domain), in a case where a request utterance to playback jazz (music playback domain) occurs, jazz is searched for and played.

Furthermore, in a dialogue context looking for music to listen to (music playback domain), such as "Tell me recommended song of the month", in a case where a request utterance to playback jazz (music playback domain) occurs, music of other genres is searched for while giving priority to jazz.

Meanwhile, in the dialogue context looking for music to listen to (music playback domain), in a case where a request utterance to view Western recipes (cooking information domain) occurs, only Western recipes are searched for and presented.

As described above, an utterance of another domain may be determined in the current dialog context.

In this case, for example, in a case where an utterance within a certain time is determined to be the same dialogue context, or in a case where members of the users who have a dialogue are completely replaced, even the utterance within a certain time is determined to be another dialogue context. Furthermore, in a case where the line of sight between users is acquired, an utterance without looking at the other party may be determined to be another dialogue context.

Moreover, in a case where a search condition of another dialog context can be reflected on the search condition of the current dialog context, and the like, exceptionally, even a different domain may be determined that the utterance is the same dialog context as the current dialog context.

For example, in the diffusion phase, in a case where a tourist destination in Yokohama is searched for and when a request utterance to playback jazz occurs, a jazz search is executed surely and presented (playback). At this time, if there is an event related to jazz in Yokohama, the jazz event is presented even if not a tourist destination.

(Request according to configuration of voice dialogue system)

FIGS. 12A and 12B are diagrams showing an example of a request according to the configuration of the voice dialogue system.

In the configuration FIG. 12A, the home agent 20 transmits a request with the condition specified on the basis of the utterance of the user 10 to the information providing server 30. The information providing server 30 executes a search under the condition specified by the home agent 20 and transmits search results thereof to the home agent 20.

In the configuration FIG. 12A, for example, in a case where the home agent 20 transmits a request to search for a restaurant in Yokohama in the estimated diffusion phase, the information providing server 30 transmits a search result of restaurants around Yokohama Station, Sakuragicho Station, and Kannai, Chinatown to the home agent 20.

That is, in the configuration FIG. 12A, as described above, the response generation unit 80 generates a query (request) based on the user's utterance according to the estimated phase.

Meanwhile, in the configuration FIG. 12B, the home agent 20 transmits a request based on the utterance of the user 10 to the information providing server 30. The information providing server 30 executes a search according to the request from the home agent 20 and transmits a plurality of search results to the home agent 20.

In the configuration FIG. 12B, for example, in a case where the home agent 20 transmits a request to search for a restaurant in Yokohama, the information providing server 30 transmits the search result of three types to the home agent 20:

(1) search result of restaurant around Yokohama Station
(2) search result of restaurant around Yokohama Station and Sakuragicho Station
(3) search result of restaurant around Yokohama Station, Sakuragicho Station, and Kannai, Chinatown. In this case, the home agent 20 presents the search result that matches the estimated phase.

That is, in the configuration FIG. 12B, the response generation unit 80 generates a response by generating a query (request) based on the user's utterance regardless of the estimated phase and selecting the search result according to the phase estimated from the search result from the information providing server 30.

In this way, in the voice dialogue system to which the present technology is applied, information may be searched for according to the estimated phase on the information providing server 30 side, or information may be presented according to the estimated phase on the home agent 20 side.

(Phase Transition According to User State)

The phase may transition as follows.

(1) User's Line of Sight

In a case where both the information according to the diffusion phase and the information according to the convergence phase are displayed on the display screen, the phase may transition according to information in the line-of-sight direction of the user.

(2) User's Preference

In a case where a user is uttering the user's preference, the phase may transition to the convergence phase. In a case where the user is uttering another topic, the phase may transition to the diffusion phase.

(3) User's Operation

It may be possible to return to the phase before change by the user's operation.

In this case, the phase transition speed may change depending on the type of device (ease of operation). For example, in a case where an easy-to-operate smartphone is used, the transition to the convergence phase is faster. In a case where a large device that is handled by a family is used, the transition to the convergence phase is slower.

Furthermore, the speed of phase transition and the range of change may be adjusted by an operation of a slider or voice instructing by the user (4) User's Situation The speed of phase transition may change depending on the user's situation, such as the user is moving or relaxing at home. For example, in a case where the user is moving, the transition to the convergence phase is faster. In a case where the user is relaxing at home, the transition to the convergence phase is slower.

Furthermore, the speed of phase transition may change depending on the user's schedule and time zone. For example, just before the user goes out, the transition to the convergence phase is faster. During nighttime hours, the transition to the convergence phase is slower.

Moreover, the transition speed and transition direction of the phase may change depending on the user's facial expression or emotion. For example, in a case where it is determined that the user's reaction when the phase transitions is negative, the phase returns to the phase before the transition.

(5) Number of Users

For example, in a case where a new member joins a conversation between users, the phase may transition to the somewhat convergence phase.

Furthermore, in a case where a plurality of users is having a conversation, the phase may transition to a phase in which information obtained by ANDing each user's topic is presented.

Moreover, in a case where there is a plurality of users, information may be presented to each of the plurality of users by screen display or directional voice.

(6) Display

In the example described above, the current phase may be presented by the color or screen display (facial expression) of the display unit 84, change in synthetic voice (voice tone) output from the voice output unit 83, and the like.

4. Phase Estimation Using Neural Network

Learning by a neural network may be used for phase estimation in the present technology.

Figure 13:
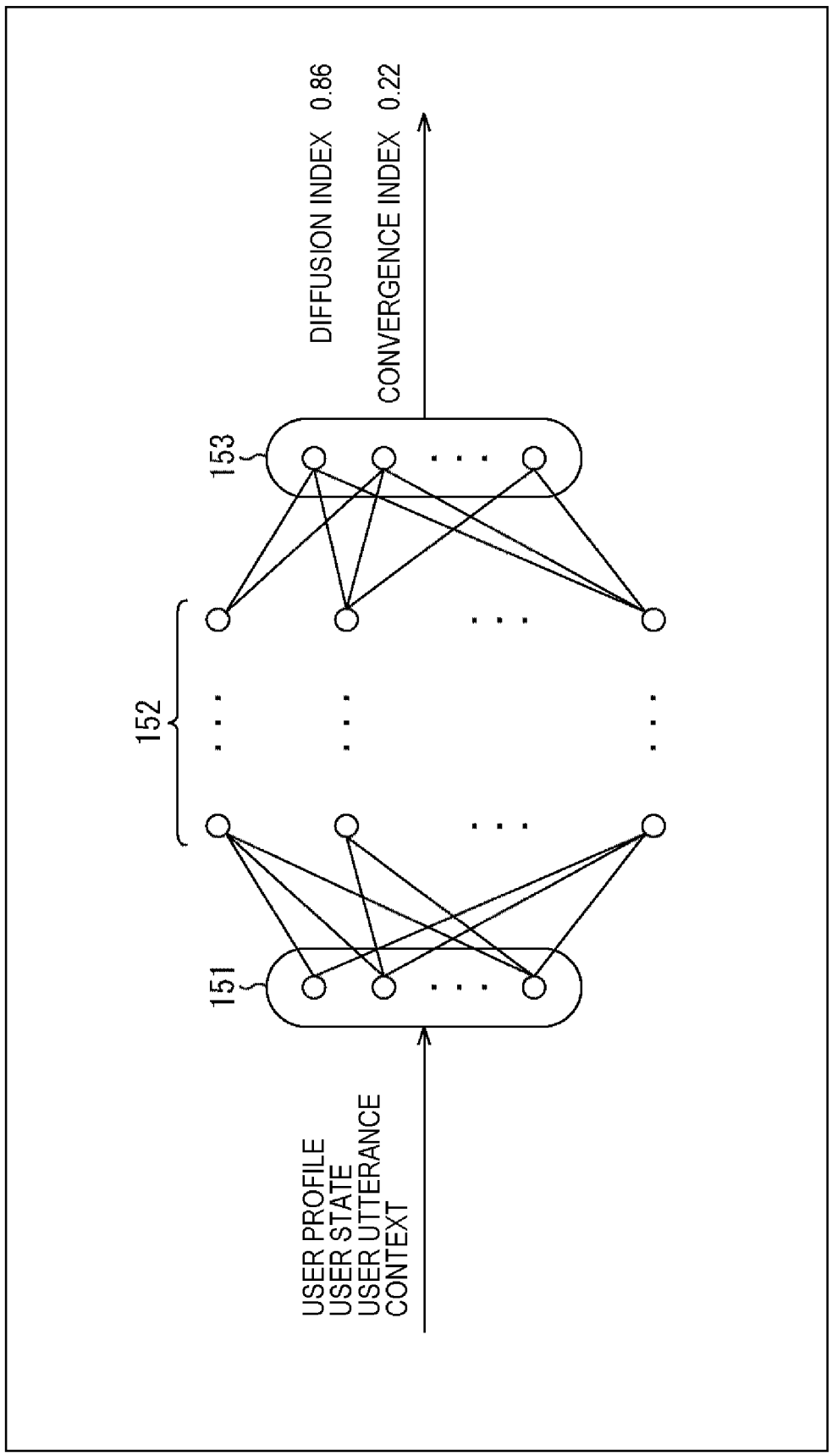
FIG. 13 is a diagram describing phase estimation using a neural network.

FIG. 13 is a diagram showing a configuration example of a neural network.

The neural network of FIG. 13 is a hierarchical neural network including an input node 151, an intermediate node 152, and an output node 153.

The above-described user profile, user state, user utterance, and context are input into the input node 151.

In the intermediate node 152, computations according to phase estimation based on the user profile, user state, user utterance, and context input into the input node 151 are performed in each neuron.

As a result of the computations in the intermediate node 152, a diffusion index and a convergence index, which are indicators of the diffusion phase/convergence phase, are output to the output node 153.

Figure 14:
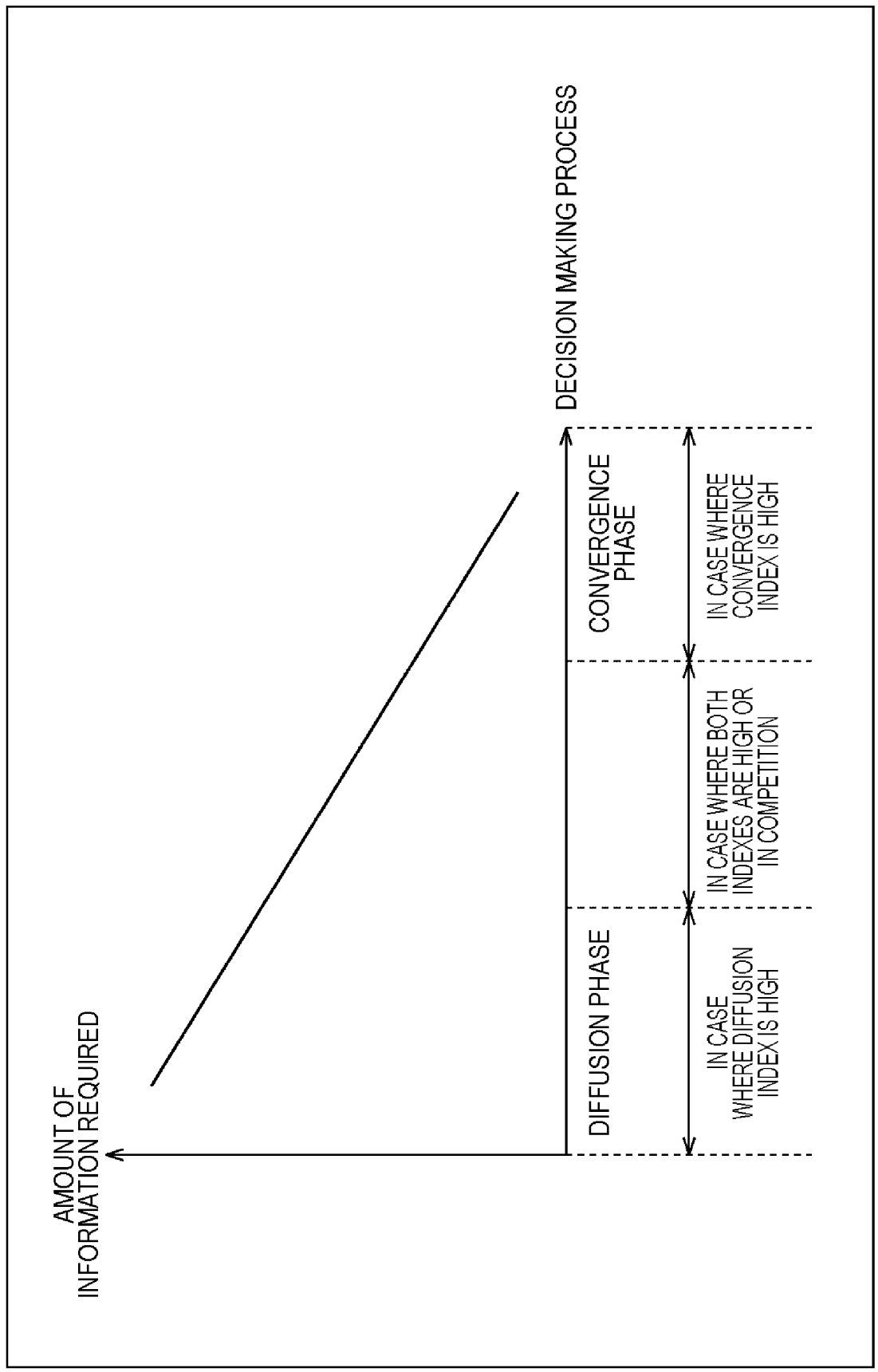
FIG. 14 is a diagram describing phase estimation using the neural network.

As shown in FIG. 14, whether the decision making process is the diffusion phase or the convergence phase is determined with the diffusion index and the convergence index.

Specifically, in a case where the diffusion index is higher than a certain value, the phase is the diffusion phase, and in a case where the convergence index is higher than a certain value, the phase is the convergence phase. Furthermore, in a case where both the diffusion index and the convergence index are higher than a certain value, or in a case where both indexes are in competition (difference between both indexes is less than a predetermined value), the phase is an intermediate phase between the diffusion phase and the convergence phase.

In the example of FIG. 13, since the diffusion index 0.86 and the convergence index 0.22 are output, for example, the phase is the diffusion phase.

In this way, the phase estimation in the present technology can be performed by using learning by a neural network.

5. Application to Cloud Computing

The present technology can also be applied to cloud computing.

Figure 15:
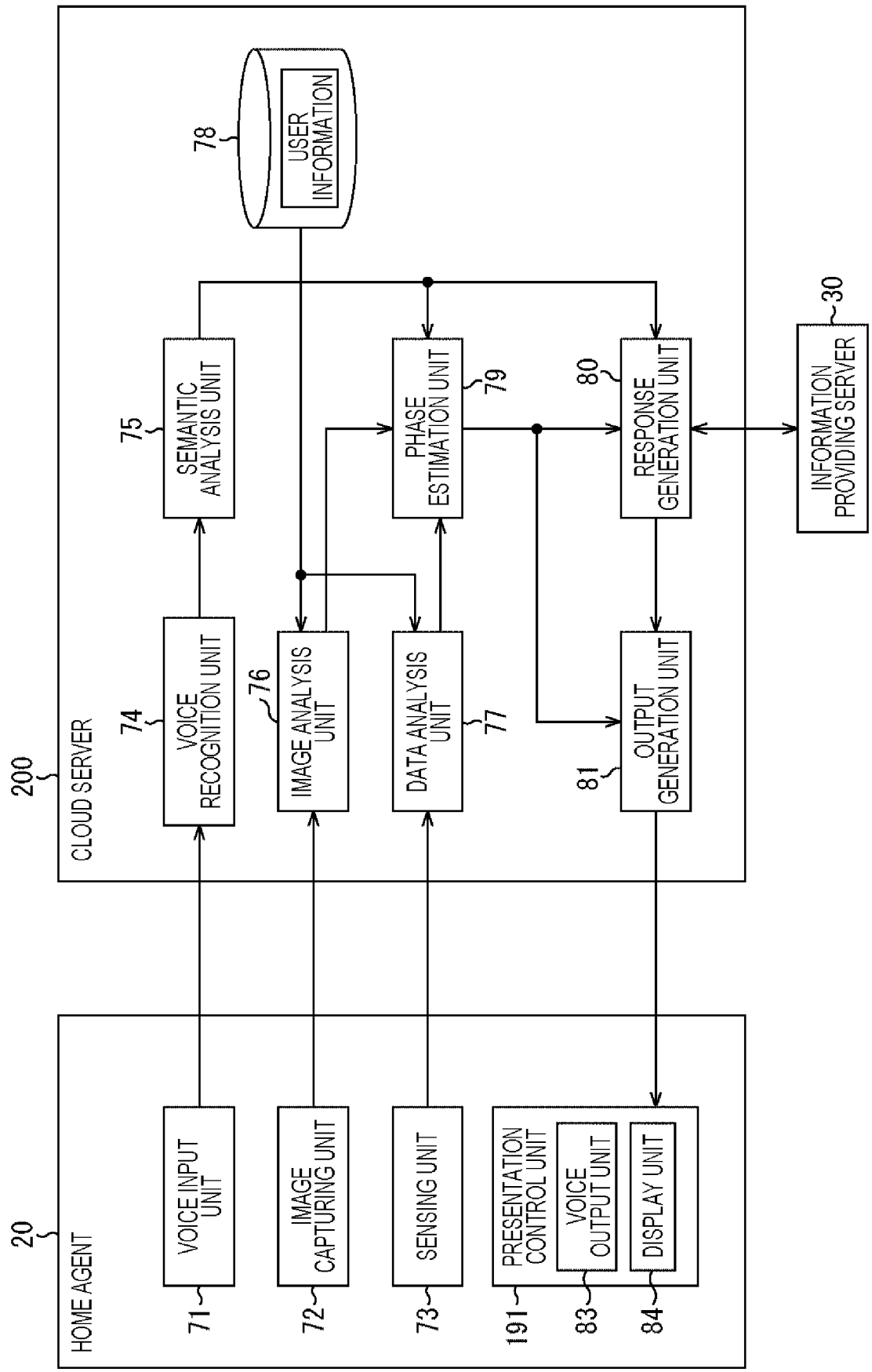
FIG. 15 is a block diagram showing a functional configuration example of a cloud server.

FIG. 15 is a block diagram showing a functional configuration example of the voice dialogue system applied to cloud computing. Note that in FIG. 15, components similar to components shown in FIG. 6 are denoted with the same reference sign, and descriptions thereof will be omitted.

As shown in FIG. 15, the home agent 20 includes the voice acquisition unit 71, the image capturing unit 72, the sensing unit 73, and a presentation unit 191 including the voice output unit 83 and the display unit 84.

Meanwhile, a cloud server 200 includes the voice recognition unit 74, the semantic analysis unit 75, the image analysis unit 76, the data analysis unit 77, the storage unit 78, the phase estimation unit 79, the response generation unit 80, and the output generation unit 81.

Note that in FIG. 15, the presentation control unit 82 of FIG. 6 is not shown, but may be provided in either the home agent 20 or the cloud server 200.

In the voice dialogue system of FIG. 15, the cloud server 200 transmits a request based on the user's utterance from the home agent 20 to the information providing server 30.

The information providing server 30 executes a search according to the request from the cloud server 200 and transmits the search result thereof to the cloud server 200.

The cloud server 200 generates a response to the user's utterance on the basis of the search result from the information providing server 30 and presents the response to the user via the home agent 20.

In such a configuration, the user's decision making process (phase) is estimated, and the response according to the estimated phase is generated, and therefore it is possible to present a more appropriate response to the user.

6. Configuration of Computer

A series of processes described above can be performed by hardware, or can be performed by software. In a case where the series of processes is performed by software, a program that constitutes the software is installed from a program recording medium to a computer built in dedicated hardware or a general-purpose personal computer or the like.

FIG. 16 is a block diagram showing a configuration example of hardware of a computer that performs the series of processes described above by the program.

The home agent 20 and the cloud server 200 described above are implemented by a computer 1000 having the configuration shown in FIG. 16.

A CPU 1001, a ROM 1002, and a RAM 1003 are connected to one another via a bus 1004.

An input-output interface 1005 is further connected to the bus 1004. An input unit 1006 including a keyboard, a mouse, or the like and an output unit 1007 including a display, a speaker, or the like are connected to the input-output interface 1005. Furthermore, a storage unit 1008 including a hard disk, a non-volatile memory, or the like, a communication unit 1009 including a network interface or the like, and a drive 1010 that drives a removable medium 1011 are connected to the input-output interface 1005

In the computer 1000 configured as described above, the CPU 1001 loads, for example, a program stored in the storage unit 1008 into the RAM 1003 via the input-output interface 1005 and the bus 1004 and executes the program, whereby the above-described series of processes is performed.

The program to be executed by the CPU 1001 is recorded, for example, on the removable medium 1011, or provided via a wired or wireless transmission medium such as a local area network, the Internet, or digital broadcasting and is installed in the storage unit 1008.

Note that the program to be executed by the computer 1000 may be a program in which processes are performed on a time-series basis in the order described in the present specification, or may be a program in which processes are performed in parallel or at necessary timing such as when a call is made.

Note that the embodiment of the present technology is not limited to the embodiment described above, and various modifications may be made without departing from the spirit of the present technology.

Furthermore, effects described in the present specification are merely illustrative and not restrictive, and other effects may be produced.

Moreover, the present technology can have the following configurations.

(1)

An information processing device including:

a phase estimation unit that estimates a phase regarding decision making of a user; and a response generation unit that generates a response to an utterance of the user according to the estimated phase.

(2)

The information processing device according to (1), in which the phase includes a diffusion phase in which a decision making process of the user is in a diffusion state and a convergence phase in which the decision making process is in a convergence state.

(3)

The information processing device according to (2), in which the response generation unit generates the response that broadly interprets the utterance of the user in the diffusion phase.

(4)

The information processing device according to (3), in which the response generation unit generates the response that certainly interprets the utterance of the user in the convergence phase.

(5)

The information processing device according to any one of (2) to (4), in which the response generation unit generates the response by generating a query based on the utterance of the user according to the phase.

(6)

The information processing device according to any one of (2) to (4), in which the response generation unit generates the response by generating a query based on the utterance of the user and selecting a search result based on the query according to the phase.

(7)

The information processing device according to any one of (2) to (6), in which the phase estimation unit estimates the phase on the basis of at least one of a profile of the user, a state of the user, the utterance of the user, and context.

(8)

The information processing device according to (7), in which the profile of the user includes an action history of the user.

(9)

The information processing device according to (7), in which the state of the user includes presence or absence of a dialogue partner of the user, a surrounding environment, and a direction of a line of sight of the user.

(10)

The information processing device according to any one of (2) to (9), further including an output generation unit that generates output information based on the generated response.

(11)

The information processing device according to (10), in which the output generation unit generates the output information for presenting the response by a presentation method according to the phase.

(12)

The information processing device according to (11), in which a number of the responses to be presented is determined by the presentation method.

(13)

The information processing device according to (12), in which it is determined by the presentation method whether the response is presented by display or voice output.

(14)

The information processing device according to (13), in which in a case where the response is presented by the display, placement of the response on the display is determined by the presentation method.

(15)

The information processing device according to any one of (11) to (14), in which the output generation unit generates the output information for further presenting relevant information related to the generated response in the diffusion phase, and the relevant information includes additional information that is not based on clear utterance of the user.

(16)

The information processing device according to (15), in which
the output generation unit generates the output information for presenting only the generated response in the convergence phase.

(17)

The information processing device according to any one of (11) to (16), further including
a presentation control unit that controls the presentation of the output information.

(18)

The information processing device according to (17), further including:
a voice acquisition unit that acquires the utterance of the user; and
a presentation unit that presents the output information under the control of the presentation control unit.

(19)

An information processing method performed by an information processing device, the method including:
generating a response to an utterance of a user according to a phase regarding decision making of the user; and
generating output information based on the generated response.

(20)

A program for causing a computer to perform processing including:
generating a response to utterance of a user according to a phase regarding decision making of the user; and
generating output information based on the generated response.

REFERENCE SIGNS LIST

20 Home agent
30 Information providing server
71 Voice acquisition unit
72 Image capturing unit
73 Sensing unit
74 Voice recognition unit
75 Semantic analysis unit
76 Image analysis unit
77 Data analysis unit
78 Storage unit
79 Phase estimation unit
80 Response generation unit
81 Output generation unit
82 Presentation control unit
83 Voice output unit
84 Display unit
191 Presentation unit
200 Cloud server

The invention claimed is:

1. An information processing device, comprising:
a central processing unit (CPU) configured to:
estimate a phase regarding decision making of a user; and
generate a response to an utterance of the user according to the estimated phase.

2. The information processing device according to claim 1, wherein
the phase includes a diffusion phase in which a decision making process of the user is in a diffusion state and a convergence phase in which the decision making process is in a convergence state.

3. The information processing device according to claim 2, wherein
the user is in the diffusion phase, and
the response is a response that broadly interprets the utterance of the user.

4. The information processing device according to claim 2, wherein
the user is in the convergence phase, and
the response is a response that certainly interprets the utterance of the user.

5. The information processing device according to claim 2, wherein
the CPU is further configured to generate the response by generation of a query based on the utterance of the user according to the estimated phase.

6. The information processing device according to claim 2, wherein
the CPU is further configured to generate the response by generation of a query based on the utterance of the user and selection of a search result based on the query according to the estimated phase.

7. The information processing device according to claim 2, wherein
the estimated phase is estimated based on at least one of a profile of the user, a state of the user, the utterance of the user, or context.

8. The information processing device according to claim 7, wherein the profile of the user includes an action history of the user.

9. The information processing device according to claim 7, wherein
the state of the user includes presence or absence of a dialogue partner of the user, a surrounding environment, and a direction of a line of sight of the user.

10. The information processing device according to claim 2,
wherein the CPU is further configured to generate output information based on the generated response.

11. The information processing device according to claim 10, wherein the CPU is further configured to:
determine a presentation method of the response based on the estimated phase; and
generate the output information for presentation by the presentation method.

12. The information processing device according to claim 11, wherein
a number of responses presented is determined by the presentation method.

13. The information processing device according to claim 11, wherein
the presentation method determines whether the response is presented by display or voice output.

14. The information processing device according to claim 13, wherein
in a case where the response is presented by the display, placement of the response on the display is determined by the presentation method.

15. The information processing device according to claim 11, wherein
the CPU is further configured to generate the output information for presentation of relevant information related to the generated response in the diffusion phase, and
the relevant information includes additional information that is not based on clear utterance of the user.

16. The information processing device according to claim 11, wherein
the CPU is further configured to generate the output information for presentation of only the generated response in the convergence phase.

17. The information processing device according to claim 11, wherein
the CPU is further configured to control presentation of the output information.

18. The information processing device according to claim 17, further comprising:
a mike configured to acquire the utterance of the user,
wherein the CPU is further configured to control one of a speaker or a display to output the output information.

19. An information processing method performed by an information processing device, the information processing method comprising:
generating a response to an utterance of a user according to a phase regarding decision making of the user; and
generating output information based on the generated response.

20. A non-transitory computer-readable medium having stored thereon, computer-executable instructions which, when executed by a processor of an information processing device, cause the processor to execute operations, the operations comprising:
generating a response to an utterance of a user according to a phase regarding decision making of the user; and
generating output information based on the generated response.

* * * * *